(12) United States Patent
Kumar et al.

(10) Patent No.: US 12,531,467 B2
(45) Date of Patent: Jan. 20, 2026

(54) SINGLE-STAGE BIDIRECTIONAL POWER SUPPLY

(71) Applicant: Delta Electronics, Inc., Taipei (TW)

(72) Inventors: Misha Kumar, Cary, NC (US); Peter Mantovanelli Barbosa, Cary, NC (US); Sergio Fernandez Rojas, Eindhoven (NL); Chao-Jui Huang, Taipei (TW)

(73) Assignee: Delta Electronics, Inc., Taipei (TW)

( * ) Notice: Subject to any disclaimer, the term of this patent is extended or adjusted under 35 U.S.C. 154(b) by 200 days.

(21) Appl. No.: 18/311,651

(22) Filed: May 3, 2023

(65) Prior Publication Data
US 2024/0372476 A1 Nov. 7, 2024

(51) Int. Cl.
*H02M 3/335* (2006.01)
*H02M 1/00* (2006.01)
(Continued)

(52) U.S. Cl.
CPC ............. *H02M 1/007* (2021.05); *H02M 3/01* (2021.05); *H02M 3/33573* (2021.05);
(Continued)

(58) Field of Classification Search
CPC .......... H02M 1/007; H02M 3/01; H02M 3/24; H02M 3/335; H02M 3/33573; H02M 3/33584; H02M 3/33592; H02M 7/06
See application file for complete search history.

(56) References Cited

U.S. PATENT DOCUMENTS 5,283,726 A 2/1994 Wilkerson
9,048,720 B2 6/2015 Ortiz
(Continued)

FOREIGN PATENT DOCUMENTS

CN 115995985 A 4/2023
JP 2022-029404 A 2/2022
(Continued)

OTHER PUBLICATIONS

Extended European Seach Report dated Nov. 4, 2024, in connection with European Application No. 24179842.0.
(Continued)

*Primary Examiner* — Gary L Laxton
(74) *Attorney, Agent, or Firm* — Wolf, Greenfield & Sacks, P.C.

(57) ABSTRACT

A bidirectional power supply includes an alternating current (AC) port as a source in a first mode and as a load in a second mode and a line-frequency rectifier/inverter to function as a rectifier in the first mode and a set of switches to function as an inverter in the second mode. A bidirectional resonant converter is coupled to a direct current (DC) port with primary-side switches and secondary-side switches respectively arranged on a primary and secondary side of a transformer. A controller controls the primary-side switches and the secondary-side switches by controlling switching frequency based on a determined value while setting time delay between control of the primary-side and the secondary-side switches to be a predefined time delay or by controlling the time delay between control of the primary-side and the secondary-side switches based on a determined value while setting the switching frequency to be a predefined switching frequency.

20 Claims, 15 Drawing Sheets

(51) Int. Cl.
    *H02M 3/00*         (2006.01)
    *H02M 7/06*         (2006.01)
    *H02M 3/24*         (2006.01)
(52) U.S. Cl.
    CPC ... *H02M 3/33584* (2013.01); *H02M 3/33592*
        (2013.01); *H02M 7/06* (2013.01); *H02M 3/24*
        (2013.01)

(56)              References Cited

U.S. PATENT DOCUMENTS

| | | | |
|---|---|---|---|
| 9,325,252 | B2 | 4/2016 | Narimani et al. |
| 9,490,704 | B2 | 11/2016 | Jang et al. |
| 10,063,158 | B1* | 8/2018 | Li ..................... H02M 3/33584 |
| 10,454,366 | B1* | 10/2019 | Li ..................... H02M 3/3382 |
| 10,536,073 | B2 | 1/2020 | Young et al. |
| 2002/0041504 | A1 | 4/2002 | Steinke |
| 2020/0177089 | A1* | 6/2020 | Abdel-Rahman ....... H02M 1/36 |
| 2020/0235656 | A1 | 7/2020 | Forouzesh et al. |
| 2021/0099096 | A1 | 4/2021 | Escudero Rodriguez et al. |
| 2021/0155100 | A1* | 5/2021 | Khaligh .................. B60L 55/00 |
| 2022/0014099 | A1 | 1/2022 | Kim et al. |
| 2022/0014106 | A1* | 1/2022 | Askarianabayaneh . H02M 1/40 |
| 2022/0045618 | A1 | 2/2022 | Kumar et al. |
| 2022/0321016 | A1 | 10/2022 | Khaligh et al. |
| 2022/0416684 | A1* | 12/2022 | Awal ..................... H02M 7/219 |
| 2023/0155514 | A1 | 5/2023 | Saha et al. |

FOREIGN PATENT DOCUMENTS

| | | |
|---|---|---|
| TW | 2005-36239 A | 11/2005 |
| TW | 202205794 A | 2/2022 |
| WO | WO 2022/190988 A1 | 9/2022 |

OTHER PUBLICATIONS

Kumar et al., Isolated Three-Port Bidirectional DC-DC Converter for Electric Vehicle Applications. IEEE Applied Power Electronics Conference and Exposition (APEC). Mar. 20, 2022. pp. 2000-2007.
Mukherjee et al., a High Power Density Wide Range DC-DC Converter for Universal Electric Vehicle Charging. IEEE Transactions on Power Electronics. Feb. 2023;38(2):1998-2012.
Twiname et al., A New Resonant Bidirectional DC-DC Converter Topology. IEEE Transactions on Power Electronics. Sep. 2014;29(9):4733-40.
Extended European Search Report dated Sep. 27, 2024, in connection with European Application No. 24166256.8.
Taiwanese Office Action dated Feb. 6, 2025, in connection with Taiwanese Application No. 113111606.
Notice of Reasons for Refusal for Japanese Application No. 2024-052149 dated Apr. 23, 2025.

* cited by examiner

SINGLE-STAGE BIDIRECTIONAL POWER SUPPLY

BACKGROUND

This invention relates to a bidirectional power supply and, more particularly, to a single-stage bidirectional power supply.

A power supply may generally convert alternating current (AC), such as from the grid, to direct current (DC). A two-stage approach may be used with a power factor correction (PFC) converter at the first stage to convert AC voltage to a DC voltage, followed by a DC-DC converter at the second stage to obtain the desired DC voltage. Generally, PFC refers to making the line current follow the shape of the line voltage. A PFC converter performs power factor correction as well as rectification of an AC input. Generally, a DC-DC converter may include a DC-AC converter that converts the source DC to AC, a transformer that passes the AC signal by electromagnetic induction to a secondary side of the transformer, and an AC-DC converter on the secondary side to provide the voltage level needed at the output. A bidirectional power supply refers to one that facilitates both AC-DC and DC-AC conversion.

SUMMARY

According to one or more embodiments, a bidirectional power supply includes an alternating current (AC) port as a source in a first mode of operation and as a load in a second mode of operation and a line-frequency rectifier/inverter including a set of diodes to function as a rectifier to rectify an AC input from the AC port in the first mode of operation and a set of switches to function as an inverter to supply the AC port in the second mode of operation. A bidirectional resonant converter is coupled to the line-frequency rectifier/inverter and to a direct current (DC) port. The bidirectional resonant converter includes a primary port with primary-side switches and a secondary side port with secondary-side switches respectively arranged on a primary and secondary side of a transformer. A controller controls the primary-side switches and the secondary-side switches during a first control mode by controlling a switching frequency based on a determined value while setting a time delay between control of the primary-side switches and the secondary-side switches to be a predefined time delay. The controller controls the primary-side switches and the secondary-side switches during a second control mode by controlling the time delay between control of the primary-side switches and the secondary-side switches based on a determined value while setting the switching frequency to be a predefined switching frequency.

According to another embodiment, a bidirectional resonant converter includes a primary port with primary-side switches and a secondary side port with secondary-side switches respectively arranged on a primary and secondary side of a transformer. A controller controls the primary-side switches and the secondary-side switches during a first control mode by controlling a switching frequency based on a determined value while setting a time delay between control of the primary-side switches and the secondary-side switches to be a predefined time delay. The controller controls the primary-side switches and the secondary-side switches during a second control mode by controlling the time delay between control of the primary-side switches and the secondary-side switches based on a determined value while setting the switching frequency to be a predefined switching frequency.

According to yet another embodiment, a method of manufacturing a bidirectional resonant converter includes coupling a line-frequency rectifier/inverter to an AC port. The line-frequency rectifier/inverter includes a set of diodes to function as a rectifier to rectify an AC input from the AC port in a first mode of operation and a set of switches to function as an inverter to supply the AC port in a second mode of operation. The method also includes coupling a bidirectional resonant converter to the line-frequency rectifier/inverter and to a direct current (DC) port. The bidirectional resonant converter includes a primary port with primary-side switches and a secondary side port with secondary-side switches respectively arranged on a primary and secondary side of a transformer. A controller is configured to control the primary-side switches and the secondary-side switches during a first control mode by controlling a switching frequency based on a determined value while setting a time delay between control of the primary-side switches and the secondary-side switches to be a predefined time delay. The controller is also configured to control the primary-side switches and the secondary-side switches during a second control mode by controlling the time delay between control of the primary-side switches and the secondary-side switches based on a determined value while setting the switching frequency to be a predefined switching frequency.

The foregoing has outlined some of the pertinent features of the disclosed subject matter. These features are merely illustrative.

BRIEF DESCRIPTION OF THE DRAWINGS

The examples described throughout the present document will be better understood with reference to the following drawings and descriptions. In the figures, like-referenced numerals designate corresponding parts throughout the different views.

DETAILED DESCRIPTION

Figure 1:
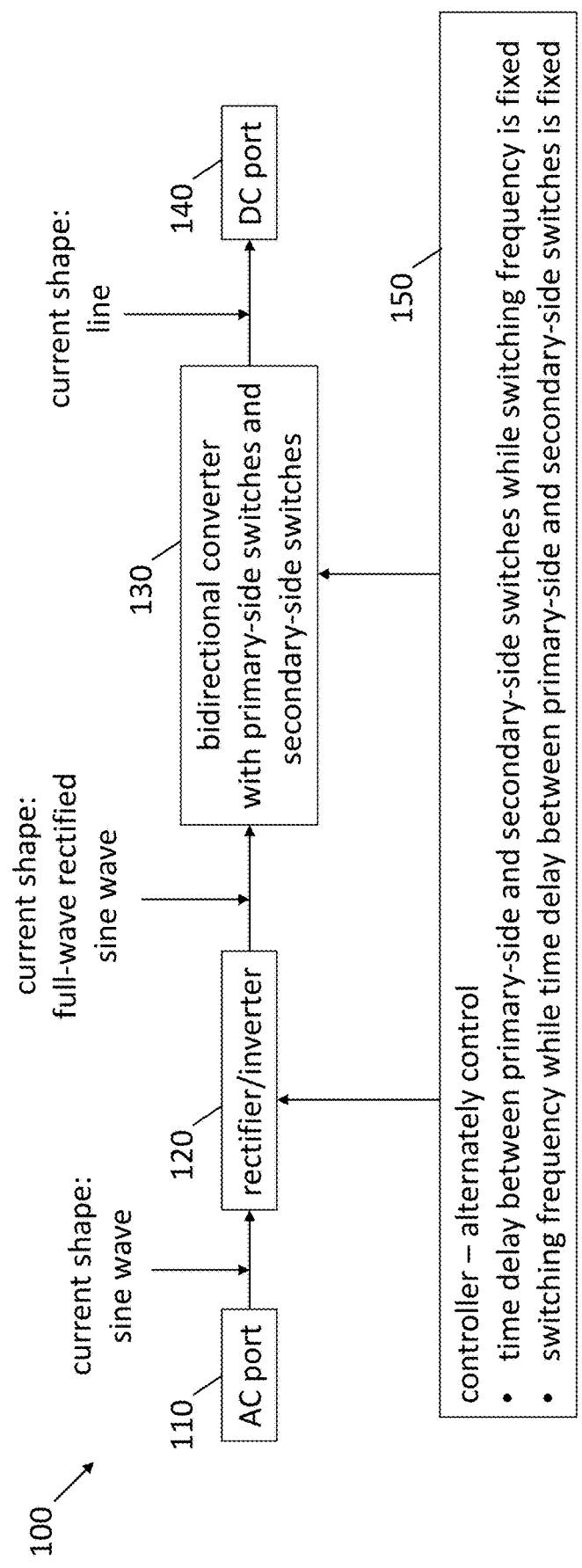
FIG. 1 is a block diagram of a single-stage bidirectional power supply according to one or more embodiments.

Reference will now be made to the drawings to describe the present disclosure in detail. It will be understood that the drawings and exemplified embodiments are not limited to the details thereof. Modifications may be made without departing from the spirit and scope of the disclosed subject matter.

A power supply to provide a DC voltage based on an AC input may typically include two separate stages to shape the input current and to regulate the DC output. Employing only a single stage may reduce the overall number of components, resulting in weight and cost savings, for example. A prior approach to a single-stage power supply involves a three-phase single-stage AC-DC converter. Each phase is connected to a full-bridge diode rectifier followed by an inductor-inductor-capacitor (LLC) converter that operates in boost mode by operating at switching frequencies below the series resonant frequency of the LLC resonant circuit and in buck mode by operating at switching frequencies above the series resonant frequency of the LLC resonant circuit. This leads to a wide variation in switching frequencies to achieve PFC operation which, in turn, leads to challenges in designing the magnetics of the transformers and in achieving high efficiency. In addition, the prior design is not suitable for bidirectional operation.

In some situations, a single-stage bidirectional power supply may be appreciated. Single-stage refers to the fact that active switches, whose operation is controllably varied, are only employed at one stage of the power supply, as opposed to both the PFC and DC-DC converter stages in the example of a typical two-stage power supply. In a typical two-stage power supply, the PFC shapes the current to follow the shape of the voltage at the first stage. The PFC may accomplish the current shaping via high frequency switching or without variable switching, but the switching frequency of the PFC cannot be the same as the frequency of the AC current (i.e., line current) in order to achieve the shaping. At the second stage of the typical two-stage power supply, a DC-DC converter regulates the output voltage. According to one or more embodiments detailed herein, the bidirectional converter of the single-stage bidirectional power supply accomplishes both the current shaping and output voltage regulation functions. A single-stage converter can be made bidirectional by employing active switches on the primary and secondary sides of the transformer.

Embodiments detailed herein relate to a single-stage bidirectional power supply that employs an alternating combination of variable frequency and variable time delay associated with control of the switches. The time delay is between operation of one set of switches of a bidirectional converter (e.g., at the primary port) and operation of another set of switches of the bidirectional converter (e.g., at the secondary port). Variable refers to a variation from a predefined switching frequency ($f_{swmin}$) or a predefined time delay ($T_{dpmin}$). The predefined switching frequency may be a minimum switching frequency and the predefined time delay may be a minimum time delay.

Alternately, the predefined switching frequency may be selected from a set of predefined switching frequencies and the predefined time delay may be selected from a set of predefined time delays. In any case, predefined refers to the fact that the switching frequency or time delay is not determined via a feedback control. The control of the switches is either at a frequency other than any predefined switching frequency with the time delay at a predefined time delay, or the control of the switches is at a predefined switching frequency with the time delay other than any predefined time delay. This control arrangement allows for handling a wide range of input and output voltages while ensuring that the switching frequency does not vary widely. As shown in the various exemplary embodiments, variations are possible in several aspects of the configuration of the single-stage bidirectional power supply.

FIG. 1 is a block diagram of a single-stage bidirectional power supply 100 according to one or more embodiments. The single-stage bidirectional power supply 100 includes an AC port 110, a line-frequency rectifier/inverter 120, a bidirectional converter 130, a DC port 140, and a controller 150. The current is shaped as a sine wave between the AC port 110 and the line-frequency rectifier/inverter 120, as a full-wave rectified sine wave between the line-frequency rectifier/inverter 120 and the bidirectional converter 130, and as a line (i.e., DC) between the bidirectional converter 130 and the DC port 140. Single-stage refers to the fact that only one aspect of the single-stage bidirectional power supply 100, the bidirectional converter 130, includes active switches whose operation is controllably changed. Bidirectional refers to the fact that power flow may be from the AC port 110 to the DC port 140 or from the DC port 140 to the AC port 110.

Figure 2:
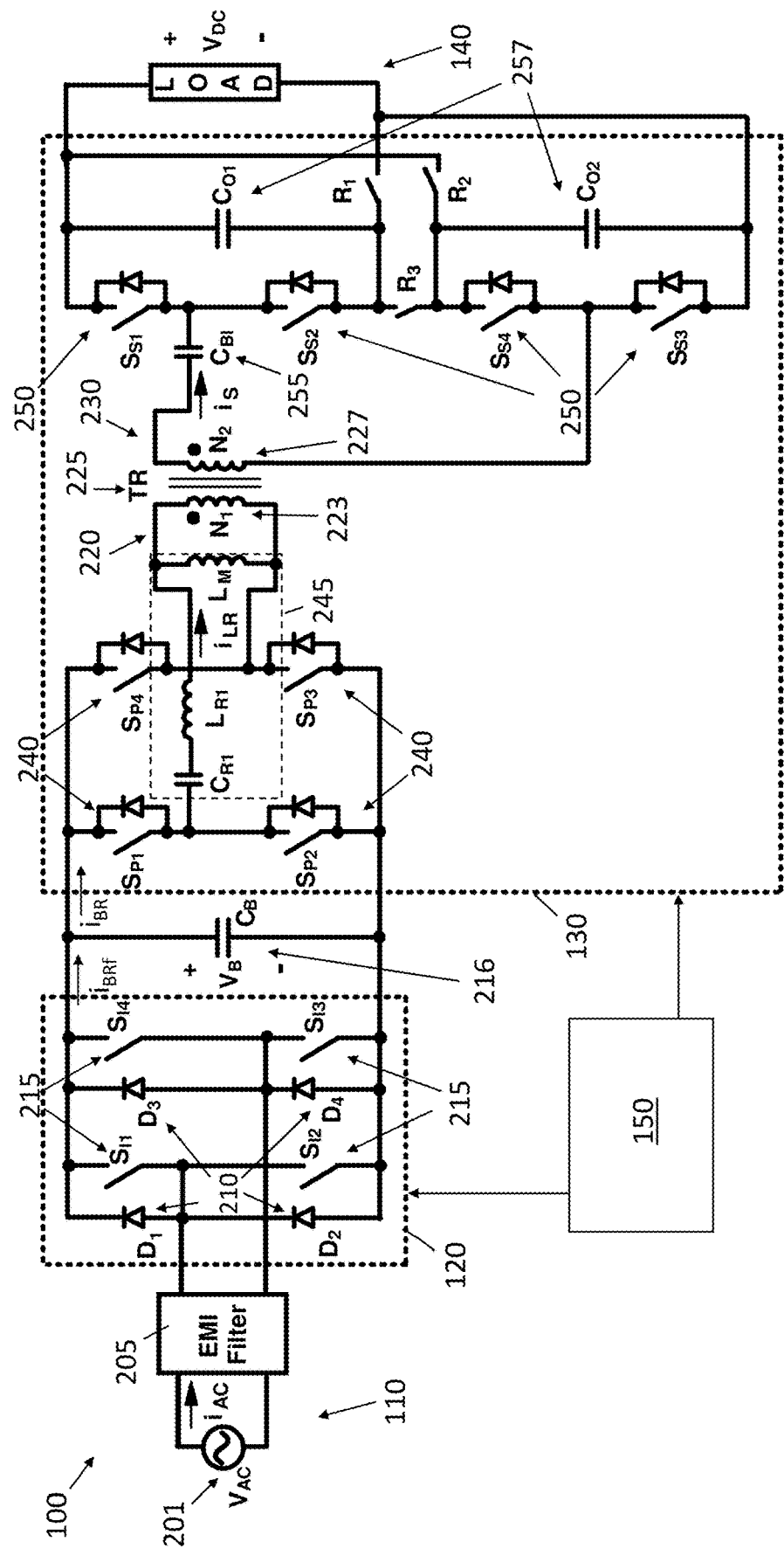
FIG. 2 is a circuit diagram of a single-stage bidirectional power supply according to an exemplary embodiment.

The line-frequency rectifier/inverter 120 includes a set of diodes 210 (FIG. 2) and switches 215 (FIG. 2). During power flow from the AC port 110 to the DC port 140, the set of diodes 210 functions as a line-frequency rectifier, converting AC to rectified AC, and during power flow from the DC port 140 to the AC port 110, switches 215 function as a line-frequency inverter, converting rectified AC back to AC. The switches 215 of the line-frequency rectifier/inverter 120 operate at a constant AC line frequency (e.g. 60 Hertz). That is, unlike a traditional PFC stage, for example, the line-frequency rectifier/inverter 120 is not a variable-frequency switching stage of the single-stage bidirectional power supply 100 in the same way as the bidirectional converter 130. Instead, switching frequency of the switches 215 of the line-frequency rectifier/inverter 120 remains at the line frequency of the AC port 110.

The line-frequency rectifier/inverter 120 and bidirectional converter 130 may be implemented according to different embodiments, as detailed in FIGS. 2 and 6-10. In every embodiment, the bidirectional converter 130 includes at least one transformer 225 with a primary port 220 and a secondary port 230 as shown in FIG. 2, for example. In addition, every embodiment includes primary-side switches 240 at the primary port 220 and secondary-side switches 250 at the secondary port 230, as also shown in FIG. 2. The controller 150 controls these primary-side switches 240 and secondary-side switches 250 based on an output DC voltage at the DC port 140 and a current flowing to the bidirectional converter 130 during AC to DC conversion and based on a reference AC current or voltage and a current flowing out of the bidirectional converter 130 during DC to AC conversion.

FIG. 2 is a circuit diagram of a single-stage bidirectional power supply 100 according to an exemplary embodiment. The controller 150 is further detailed in FIGS. 3A and 3B. The exemplary embodiment shown in FIG. 2 illustrates AC to DC conversion. As such, the AC port 110 is shown with an AC source 201 ($V_{AC}$), such as from the grid, and the DC port 140 is shown with a load that receives an output DC voltage ($V_{DC}$). The current $i_{AC}$ flows from the AC port 110, as shown. An EMI filter 205 may be used to filter out high frequency common mode and differential mode noise from the current $i_{AC}$ prior to the AC input to the line-frequency rectifier/inverter 120, which is a full-bridge line frequency rectifier/inverter according to the exemplary embodiment shown in FIG. 2.

The line-frequency rectifier/inverter 120 includes diodes 210 $D_1$-$D_4$ and switches 215 $S_{I1}$-$S_{I4}$. As previously noted, these switches 215 are not variable high-frequency switches (i.e., they are not controlled to operate at different high switching frequencies). In fact, they always operate at a constant AC line frequency (e.g., 60 Hertz (Hz) in the case of the line frequency being 60 Hz). A capacitor 216 $C_B$ separates the line-frequency rectifier/inverter 120 and the bidirectional converter 130. The line-frequency rectifier/inverter 120, implemented as the full-bridge line rectifier in the AC to DC embodiment shown in FIG. 2, rectifies the AC source 201 ($V_{AC}$) such that the voltage $V_B$ across the capacitor 216 $C_B$ varies from zero to the peak of the source voltage $V_{AC}$. The capacitance of the capacitor 216 $C_B$ may be small in order to obtain the voltage $V_B$ as rectified AC rather than DC with AC ripple.

The line-frequency rectifier/inverter 120 may be implemented as a full-bridge diode rectifier formed by the diodes 210 $D_1$-$D_4$ by disabling the switches 215 $S_{I1}$-$S_{I4}$ or by operating the switches 215 $S_{I1}$-$S_{I4}$ as synchronous rectifiers. The bidirectional converter 130 then converts the rectified AC voltage ($V_B$) to the output DC voltage ($V_{DC}$). According to an embodiment in which the bidirectional converter 130 converts DC to AC, the line-frequency rectifier/inverter 120 may be implemented as an inverter by operating the switches $S_{I1}$ and $S_{I3}$ during the positive half cycle of AC voltage and the switches $S_{I2}$ and $S_{I4}$ during the negative half cycle of AC voltage. According to this embodiment, the bidirectional converter 130 converts a DC input ($V_{DC}$) to the rectified AC voltage ($V_B$).

The bidirectional converter 130 includes a primary port 220 and secondary port 230 of a transformer 225, as previously noted. The primary port 220 includes a primary winding 223 of $N_1$ turns and the secondary port 230 includes a secondary winding 227 of $N_2$ turns. As also previously noted, the primary port 220 includes primary-side switches 240 $S_{P1}$-$S_{P4}$ and the secondary port 230 includes secondary-side switches 250 $S_{S1}$-$S_{S4}$. The exemplary primary port 220 shown in FIG. 2 includes an inductor $L_{R1}$, inductor $L_M$, and capacitor $C_{R1}$, which is a resonant circuit 245 that is an LLC resonant circuit. A primary-side current $i_{LR}$ flows through the inductor $L_{R1}$. The primary port 220 according to alternate embodiments may include a different resonant circuit 245. For example, the primary port 220 may implement a CLLC or CLLLC resonant converter or a series resonant converter (SRC) consisting of an inductor and capacitor in series.

The secondary port 230 includes a blocking capacitor 255 $C_{B1}$. As shown in FIG. 2, secondary-side current $i_s$ flows through the blocking capacitor 255 $C_{B1}$. The secondary port 230 may be dynamically modified via the relays $R_1$, $R_2$, and $R_3$ to operate with either a full-bridge or stacked half-bridge configuration. The configurable arrangement may facilitate outputting a wide DC output voltage range. For example, the relays $R_1$ and $R_2$ may be controlled (e.g., by the controller 150) to be open (off) while the relay $R_3$ is closed (on) for a stacked half-bridge configuration when the value of $V_{DC}$ is relatively large (e.g., above a predefined threshold voltage). In this case, the average voltage across the blocking capacitor 255 $C_{B1}$ is equal to half the output DC voltage ($V_{DC}$) such that the voltage at the secondary terminals of the transformer 225 varies from $-V_{DC}/2$ to $V_{DC}/2$.

Alternately, the relays $R_1$ and $R_2$ may be controlled to be closed (on) while the relay $R_3$ is controlled to be open (off) for a full-bridge configuration when the value of $V_{DC}$ is relatively small (e.g., below the threshold voltage). In this case, the average voltage across the blocking capacitor 255 $C_{B1}$ is zero and the voltage at the secondary terminals of the transformer 225 varies between $+V_{DC}$ to $-V_{DC}$. As a result, operation of the stacked half-bridge configuration at higher values of $V_{DC}$ may be similar to operation of the full-bridge configuration at lower values of $V_{DC}$. The threshold voltage forming the basis for control of the relays $R_1$, $R_2$, and $R_3$ may depend on the voltage rating of the secondary-side switches 250 $S_{S1}$-$S_{S4}$.

Figure 3A:
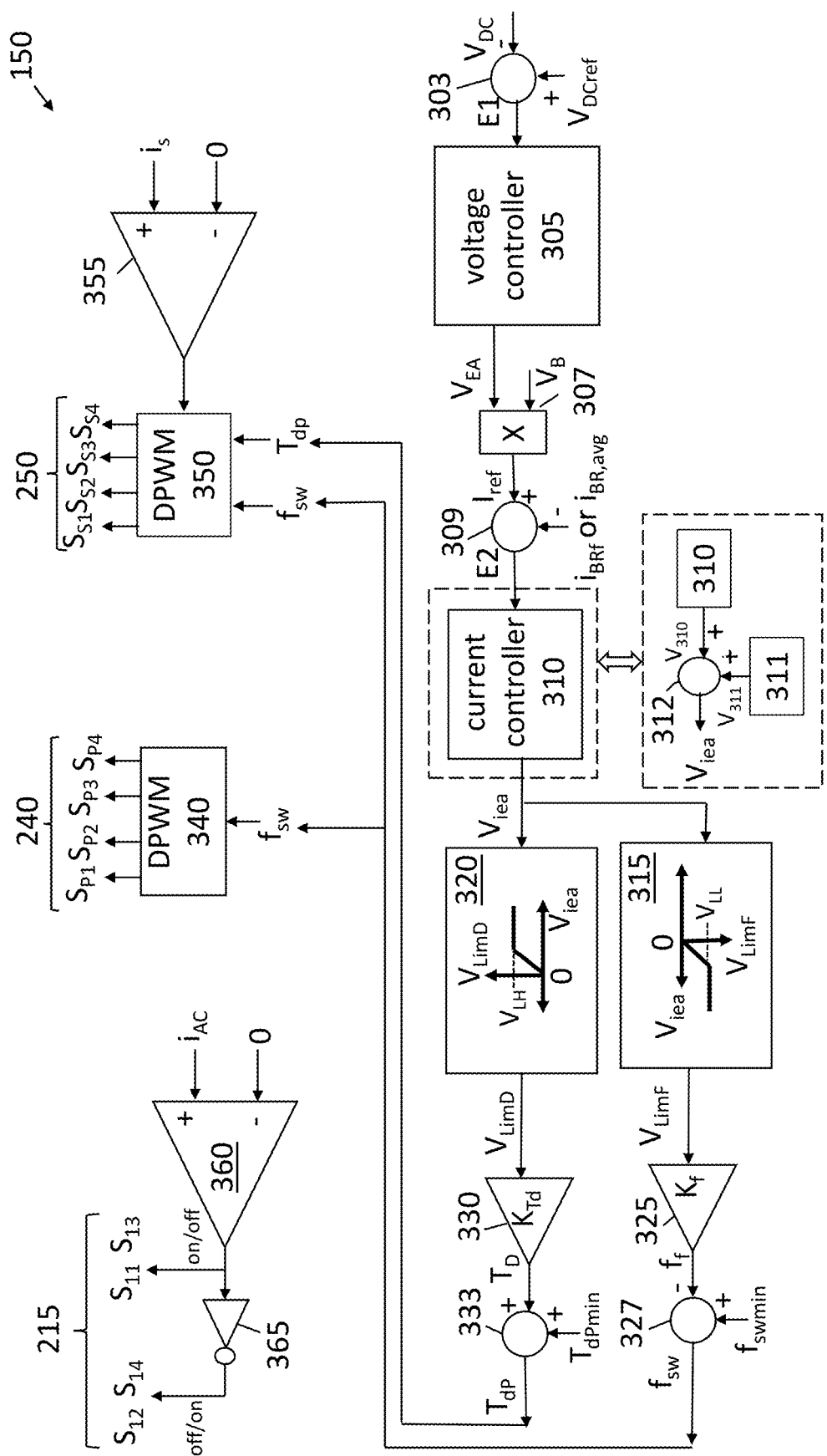
FIG. 3A shows aspects of the operation of an exemplary controller during alternating current (AC) to direct current (DC) conversion.
Figure 3B:
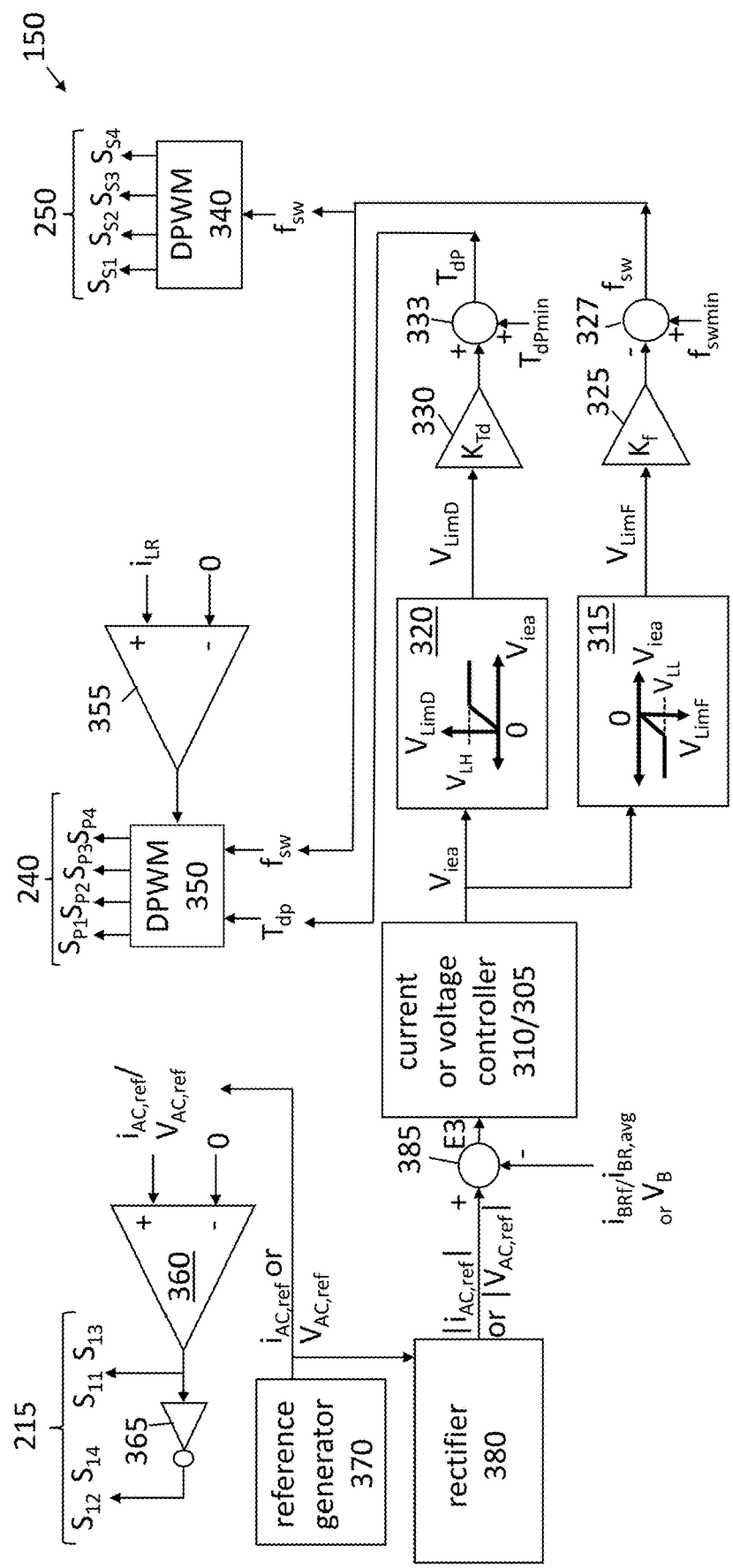
FIG. 3B shows aspects of the operation of the exemplary controller during DC to AC conversion.

As previously noted, the control of the switches 240, 250 may be alternated between a predefined switching frequency with variable time delay between the switches 240, 250 and a predefined time delay between the switches 240, 250 with variable switching frequency. Such a control scheme may reduce the overall switching frequency range requirement. FIGS. 3A and 3B detail aspects of the operation of the controller 150.

FIG. 3A shows aspects of the operation of the controller 150 according to an embodiment. Specifically, functions of the controller 150 during conversion from AC to DC are shown. As shown at the bottom right of FIG. 3A, the output DC voltage ($V_{DC}$) provided by the bidirectional converter 130 at the DC port 140 is subtracted from a reference DC voltage ($V_{DCref}$) that may represent, for example, the desired DC voltage for a load at the DC port 140. The subtractor 303 result (E1) is provided to a voltage controller 305 that may be a proportional integral (PI) controller, for example. A known PI controller combines proportional control, in which the output ($V_{EA}$, as shown) is proportional to an input error (E1), and integral control, in which the output $V_{EA}$ is proportional to the integral of the input error E1. The voltage controller 305 may be regarded as an error amplifier.

The output of the voltage controller 305, the voltage $V_{EA}$, is provided to a multiplier 307, along with the rectified AC voltage ($V_B$). The voltage $V_{EA}$ indicates an input admittance while the rectified AC voltage $V_B$ indicates the shape of the voltage. The output of the multiplier 307 is a reference current $I_{ref}$ that is provided to a subtractor 309.

The current $i_{BR}$ at the input of the bidirectional converter is a pulsating current. Thus, a filtered current $i_{BRf}$ may be sensed or an average current $i_{BR,avg}$ may be determined as discussed with reference to FIG. 4. This sensed or obtained current $i_{BRf}/i_{BR,avg}$ is subtracted from the reference current $I_{ref}$ at the subtractor 309, and the result (E2) is provided to a current controller 310. The current controller 310 may be a PI controller like the voltage controller, for example. As shown in FIG. 3A, according to an exemplary embodiment, the current controller 310 outputs a voltage $V_{iea}$.

According to an alternate embodiment shown in FIG. 3A, a feed forward approach may be used. Specifically, a mapping 311 may be created between the output DC voltage ($V_{DC}$), output power at the DC port 140, AC source 201 ($V_{AC}$), and/or rectified AC voltage ($V_B$) and a voltage $V_{311}$ using a computation based on the known values. This mapped voltage $V_{311}$ is added to the output $V_{310}$ of the current controller 310 at the adder 312 to provide the voltage $V_{iea}$. According to this feed forward approach, the required $V_{iea}$ may be reached in fewer control cycles and improved total harmonic distortion may be achieved. The current controller output $V_{iea}$ causes the controller 150 to output either a determined percentage time delay $T_{dp}$ between the switches 240, 250 at a predefined minimum switching frequency $f_{swmin}$ or a determined switching frequency $f_{sw}$ at a predefined minimum percentage time delay $T_{dpmin}$. The percentage time delay $T_{dp}$ is with respect to the switching period $T_{sw}$ such that:

$$T_{dp} = \frac{T_d}{T_{sw}} \quad [\text{EQ. 1}]$$

The current controller output $V_{iea}$ is a positive value when the sensed or obtained current $i_{BR}/i_{BR,avg}$ is smaller than the reference current $I_{ref}$. In this case, at limiter F 315, the scale level $V_{LimF}$ is set to 0 while, at limiter D 320, the scale value $V_{LimD}$ is a non-zero value up to an upper limit $V_{LH}$. Alternately, the current controller output $V_{iea}$ is a negative value when the sensed or obtained current $i_{BR}/i_{BR,avg}$ is larger than the reference current $I_{ref}$. In this case, at limiter F 315, the scale value $V_{LimF}$ is a non-zero value down to a lower limit $V_{LL}$, while, at limiter D 320, the scale value $V_{LimD}$ is set to 0.

The gain 325 $K_f$ converts the scale value $V_{Limf}$ to a frequency $f_f$ that that is subtracted from the minimum switching frequency $f_{swmin}$ at the subtractor 327 to provide the switching frequency $f_{sw}$ at which the switches 240, 250 are controlled. The gain 330 $K_{TD}$ converts the scale value $V_{LimD}$ to percentage time delay TD that is added to a minimum percentage time delay $T_{dPmin}$ at the adder 333 to provide the percentage time delay $T_{dp}$ separating control of the switches 240, 250. When the sensed or obtained current $i_{BR}/i_{BR,avg}$ is smaller than the reference current $I_{ref}$ ($V_{iea}$ is a positive value), then scale value $V_{LimF}$ is set to 0 and scale value $V_{LimD}$ is non-zero. In this case, the switching frequency $f_{sw}$ is set at $f_{swmin}$ but the percentage time delay $T_{dp}$ is changed from $T_{dpmin}$ based on the scale value $V_{LimD}$.

On the other hand, when the sensed or obtained current $i_{BR}/i_{BR,avg}$ is larger than the reference current $I_{ref}$ ($V_{iea}$ is a negative value), then scale value $V_{LimF}$ is non-zero and scale value $V_{LimD}$ is set to 0. In this case, the switching frequency $f_{sw}$ is changed from $f_{swmin}$ based on the scale value $V_{LimF}$ but the percentage time delay $T_{dp}$ is set at $T_{dpmin}$. Although one predefined switching frequency value $f_{swmin}$ and one predefined time delay value $T_{dpmin}$ are shown for explanatory purposes, a set of predefined values may be available for selection, as previously noted. For example, a predefined time delay value $T_{dpmin}$ may be selected from a set of predefined values based on the value of the voltage $V_B$ across the capacitor 216 $C_B$ in order to improve total harmonic distortion (THD) and limit switching frequency range.

As FIG. 3A indicates, the switches 215 at the rectifier/inverter 120 are not variable high-frequency switches and are unaffected by the values of the switching frequency $f_{sw}$ and percentage time delay $T_{dp}$ determined based on the output DC voltage ($V_{DC}$) provided by the bidirectional converter 130 at the DC port 140. Instead the comparator 360 compares current $i_{AC}$ from the AC port 110 with 0, as shown. When $i_{AC}>0$, then the comparator 360 output is high. In this case, switches $S_{11}$ and $S_{13}$ are on (closed). Further, based on the inverter 365, the complementary switches $S_{12}$ and $S_{14}$ at the rectifier/inverter 120 are off (open). Alternately, when $i_{AC}<0$, then the comparator 360 output is low. In this case, switches $S_{11}$ and $S_{13}$ are off (open). Further, based on the inverter 365, the complementary switches $S_{12}$ and $S_{14}$ at the rectifier/inverter 120 are on (closed).

The primary-side switches 240 lead the secondary-side switches 250 in the case of AC to DC conversion. Thus, as indicated in FIG. 3A, the primary-side switches 240 are affected only by the switching frequency $f_{sw}$, while the secondary-side switches 250 are affected by both the switching frequency $f_{sw}$ and the percentage time delay $T_{dp}$ that defines the delay in control of the secondary-side switches 250 relative to the primary-side switches 240.

Specifically, the switching frequency $f_{sw}$ is provided to a digital pulse width modulator (DPWM) 340 to control the frequency at which each of the primary-side switches 240 $S_{P1}$-$S_{P4}$ is turned on or off. Both the switching frequency $f_{sw}$ and the percentage time delay $T_{dp}$ are provided to a DPWM 350 affecting control of each of the secondary-side switches 250 $S_{S1}$-$S_{S4}$. A comparator 355 also provides input to the DPWM 350 and controls the function of the secondary-side switches 250 to operate as synchronous rectifiers to produce a DC output. The comparator 355 compares the secondary-side current $i_s$ that flows through the blocking capacitor 255 $C_{B1}$ and 0. That is, when $i_s>0$, then the comparator 355 output is high. Alternately, when $i_s<0$, then the comparator 355 output is low.

FIG. 3B shows aspects of the operation of the controller 150 according to an embodiment. Specifically, functions of the controller 150 during conversion from DC to AC are shown. As a comparison with FIG. 3A indicates, generation of $V_{iea}$ differs in FIG. 3B since the output to be controlled is at the AC port 110 rather than at the DC port 140. As shown, a reference generator 370 generates a reference AC current $i_{AC,ref}$ or a reference AC voltage $V_{AC,ref}$ that may represent the desired output at the AC port 110. A rectifier 380 provides a rectified reference AC current $|i_{AC,ref}|$ based on the reference AC current $i_{AC,ref}$ or a rectified reference AC voltage $|V_{AC,ref}|$ based on the reference AC voltage $V_{AC,ref}$. At the subtractor 385, sensed or obtained current $i_{BR}/i_{BR,avg}$ is subtracted from the rectified reference AC current $|i_{AC,ref}|$ or the rectified AC voltage $V_B$ is subtracted from the rectified reference AC voltage $|V_{AC,ref}|$ to provide an output E3. E3 is provided to the current controller 310 (when the reference generator 370 provides the reference AC current $i_{AC,ref}$) or to the voltage controller 305 (when the reference generator 370 provides the reference AC voltage $V_{AC,ref}$) to obtain output $V_{iea}$.

The determination of switching frequency $f_{sw}$ and percentage time delay $T_{dp}$ based on $V_{iea}$ is identical to the determination discussed with reference to FIG. 3A and is not described again. As previously noted, control of the switches 240, 250 is based on the switching frequency $f_{sw}$ and, in the case of the switches 240, the control is also based on percentage time delay $T_{dp}$, whereas the switches 215 operate at AC line frequency and are not controlled based on the switching frequency $f_{sw}$ or percentage delay-time $T_{dP}$.

Instead, the output of the reference generator 370 (i.e., the reference AC current $i_{AC,ref}$ or the reference AC voltage $V_{AC,ref}$) is provided to the comparator 360 with 0. When the output of the reference generator 370 is greater than 0, then the comparator 360 output is high. In this case, switches $S_{11}$ and $S_{13}$ are on (closed). Further, based on the inverter 365, the complementary switches $S_{12}$ and $S_{14}$ at the rectifier/inverter 120 are off (open). Alternately, when the output of the reference generator 370 is less than 0, then the comparator 360 output is low. In this case, switches $S_{11}$ and $S_{13}$ are off (open). Further, based on the inverter 365, the complementary switches $S_{12}$ and $S_{14}$ at the rectifier/inverter 120 are on (closed).

Unlike the AC to DC conversion scenario discussed with reference to FIG. 3A, in the DC to AC conversion scenario that pertains to FIG. 3B, the secondary-side switches 250 lead the primary-side switches 240. Thus, as indicated in FIG. 3B, the secondary-side switches are controlled only by the switching frequency $f_{sw}$, while the primary-side switches 240 are controlled by both the switching frequency $f_{sw}$ and the percentage time delay $T_{dp}$ that defines the delay in control of the primary-side switches 240 relative to the secondary-side switches 250.

Specifically, the switching frequency $f_{sw}$ is provided to the DPWM 340 to control the frequency at which each of the secondary-side switches 250 $S_{S1}$-$S_{S4}$ is turned on or off. Both the switching frequency $f_{sw}$ and the percentage time delay $T_{dp}$ are provided to DPWM 350 affecting control of each of the primary-side switches 240 $S_{P1}$-$S_{P4}$. The comparator 355 also provides input to the DPWM 350 and helps to operate the primary-side switches 240 as synchronous rectifiers. The comparator 355 compares the primary-side current $i_{LR}$ that flows through the inductor $L_{R1}$ and 0. That is, when $i_{LR}>0$, then the comparator 355 output is high. Alternately, when $i_{LR}<0$, then the comparator 355 output is low.

Figure 4:
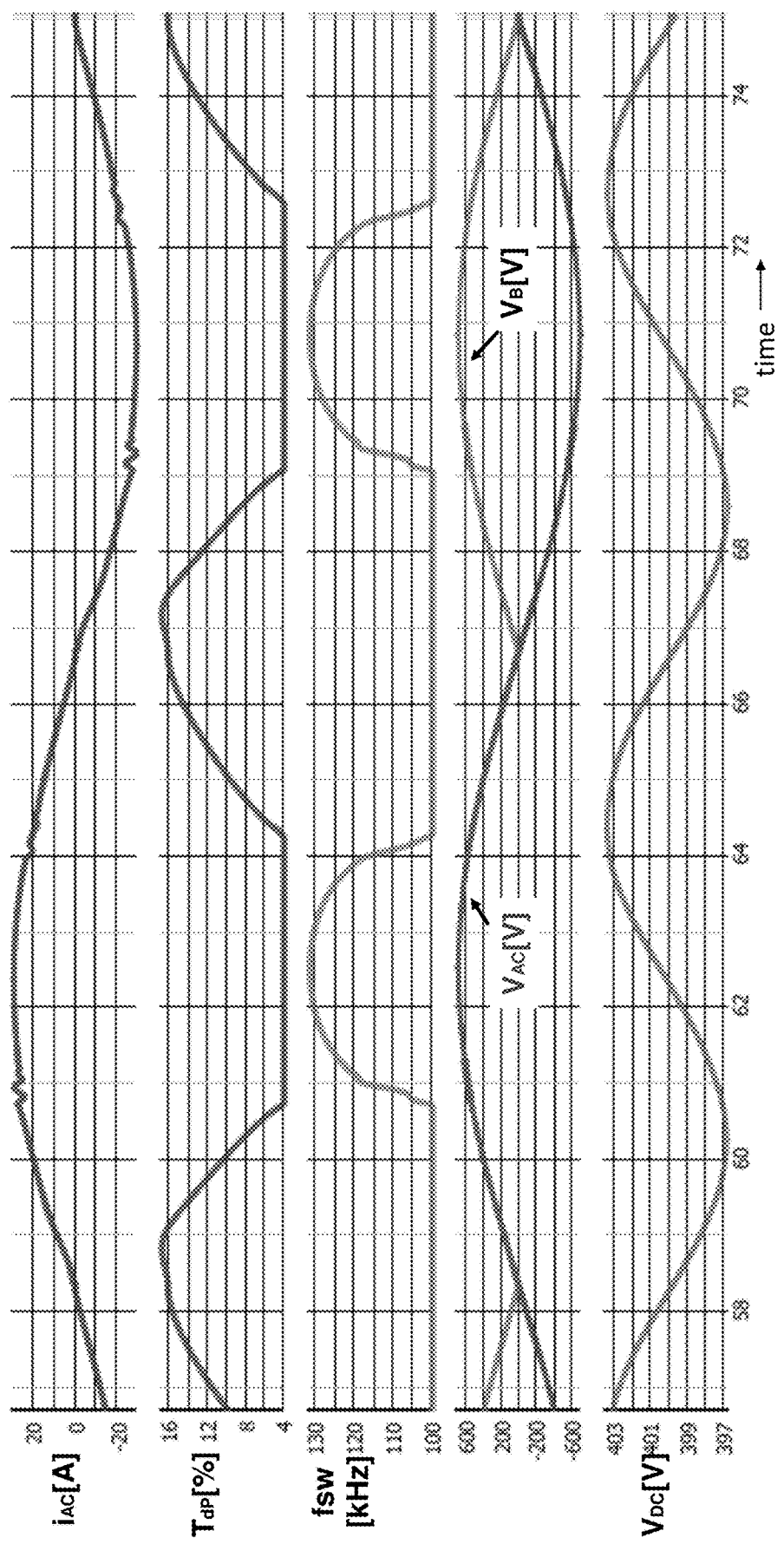
FIG. 4 illustrates current shaping achieved by the bidirectional converter of the single-stage bidirectional power supply according to one or more embodiments.

FIG. 4 illustrates the current shaping performed by the bidirectional converter 130 based on the control discussed with reference to FIGS. 3A and 3B. The values shown in FIG. 4 are indicated in the exemplary circuit diagram of FIG. 2. The output DC voltage $V_{DC}$ is shown as output voltage Vo in FIG. 6. The current $i_{AC}$ from the AC port 110 is shaped via control of the percentage (%) time delay $T_{dp}$ between the primary-side switches 240 and the secondary-side switches 250 and the switching frequency $f_{sw}$ indicated in kilohertz (kHz). The source voltage $V_{AC}$ and the voltage $V_B$ across the capacitor 216 $C_B$ are also indicated, along with the output DC voltage $V_{DC}$, in volts (V).

As FIG. 4 illustrates, as the source voltage $V_{AC}$ crosses 0, the percentage time delay $T_{dp}$ starts decreasing. As the source voltage $V_{AC}$ increases from 0, the percentage time delay $T_{dp}$ decreases while the switching frequency $f_{sw}$ is fixed. As the source voltage $V_{AC}$ approaches its peak value, the percentage time delay $T_{dp}$ is fixed while the switching frequency $f_{sw}$ increases. As the source voltage $V_{AC}$ decreases from its peak value, the percentage time delay $T_{dp}$ remains fixed while the switching frequency $f_{sw}$ decreases. When the source voltage $V_{AC}$ is decreasing to 0 crossing, the percentage time delay $T_{dp}$ increases while the switching frequency $f_{sw}$ is fixed. As discussed with reference to FIGS. 3A and 3B, this control scheme for the percentage time delay $T_{dp}$ and the switching frequency $f_{sw}$ controls the primary side switches 240 and the secondary side switches 250 of the bidirectional converter 130. As FIG. 4 illustrates, the control shapes the current $i_{AC}$ from the AC port 110 to follow the shape of the source voltage $V_{AC}$.

Figure 5:
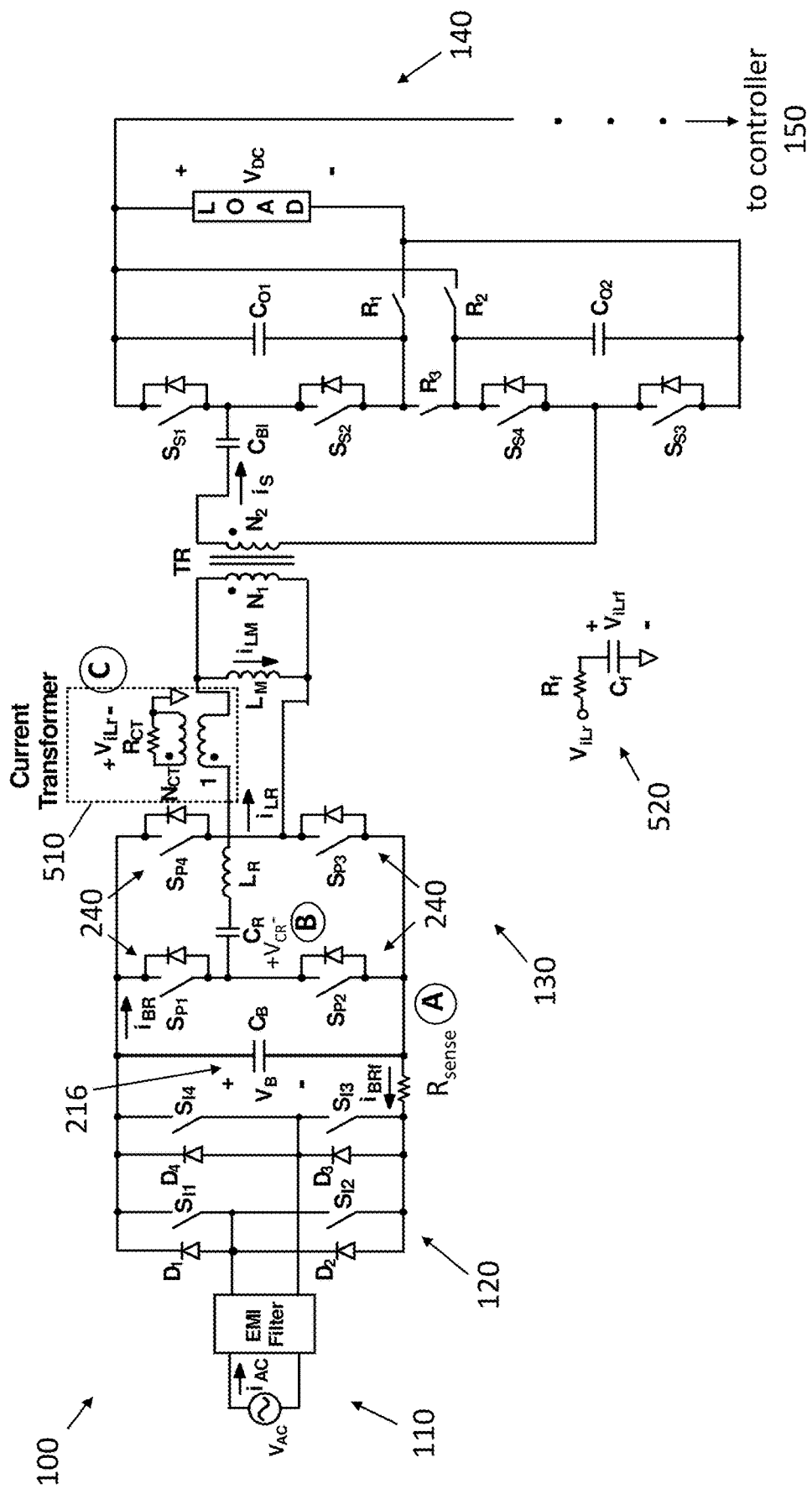
FIG. 5 is a circuit diagram of a single-stage bidirectional power supply illustrating optional embodiments.

FIG. 5 is a circuit diagram of a single-stage bidirectional power supply 100 illustrating optional embodiments. The exemplary single-stage bidirectional power supply 100 of FIG. 5 is used to show three different approaches, indicated as A, B, and C, to determining the sensed or obtained current $i_{BRf}/i_{BR,avg}$ used in the control scheme described with reference to FIGS. 3A and 3B. Only one of these approaches may be implemented in a single-stage bidirectional power supply 100 according to an exemplary embodiment. The exemplary single-stage bidirectional power supply 100 shown in FIG. 5 is similar in configuration to the one shown in FIG. 2, and only relevant components are labeled and discussed. The controller 150 is not shown. Generally, the single-stage bidirectional power supply 100 includes an AC port 110, line-frequency rectifier/inverter 120, bidirectional converter 130, and DC port 140.

For the approach indicated as A, a sensing resistor $R_{sense}$ may be included between the line-frequency rectifier/inverter 120 and the capacitor 216 $C_B$. The capacitor 216 $C_B$ may have a small value of capacitance as previously noted and may absorb high frequency ripple of current $i_{BR}$. As such, a filtered current $i_{BRf}$ with very small ripple flows through the sensing resistor $R_{sense}$. The magnitude of this filtered current $i_{BRf}$ is the average value $i_{BR,avg}$ of the input current $i_{BR}$ to the bidirectional converter 130. As a result, the filtered current $i_{BRf}$ obtained by measuring voltage across the sensing resistor $R_{sense}$ is the sensed current that may be used by the controller 150 according to an exemplary embodiment.

The approach indicated as B is based on the fact that, when switches 240 SP1 and SP3 are on (i.e., closed), $i_{BR}=i_{LR}$. Thus, the average value $i_{BR,avg}$ of the input current $i_{BR}$ to the bidirectional converter 130 may be obtained by integrating current $i_{LR}$ over a half switching period $T_{sw}/2$ when switches 240 SP1 and SP3 are on. Specifically, the average value $i_{BR,avg}$ is given by:

$$i_{BR,avg} = \frac{\int_{T_{on}}^{T_{off}} i_{LR} \cdot dt}{\frac{T_{sw}}{2}} \quad [\text{EQ. 2}]$$

In EQ. 2, $T_{on}$ is the time when switch 240 $S_{P1}$ turns on, $T_{off}$ is the time when switch 240 $S_{P1}$ turns off, and the switching period $T_{sw}$ is $1/f_{sw}$ or the inverse of switching frequency. Integration of resonant inductor current $i_{LR}$ during half the switching period $T_{sw}$ is proportional to the difference in voltage $V_{CR}$ across the resonant capacitor $C_R$. Thus, EQ. 2 may be modified to:

$$\int_{V_{CRon}}^{V_{CRoff}} dV_{CR} = \frac{\int_{T_{on}}^{T_{off}} i_{LR} \cdot dt}{C_R} \quad [\text{EQ. 3}]$$

In EQ. 3, $V_{CRon}$ is the voltage across the resonant capacitor $C_R$ when the switch 240 $S_{P1}$ turns on and $V_{CRoff}$ is the voltage across the resonant capacitor $C_R$ when the switch 240 $S_{P1}$ turns off. The average value $i_{BR,avg}$ of the input current $i_{BR}$ to the bidirectional converter 130 may be obtained from EQS. 2 and 3 as:

$$i_{BR,avg} = C_R \cdot \frac{V_{CRoff} - V_{CRon}}{\frac{T_{sw}}{2}} \quad [\text{EQ. 4}]$$

Because the value of the voltage $V_{CRon}$ across the resonant capacitor $C_R$ when the switch 240 $S_{P1}$ turns on is the same as the value of the voltage $V_{CRoff}$ across the resonant capacitor $C_R$ when the switch 240 $S_{P1}$ turns off ($V_{CRoff}=-V_{CRon}$), EQ. 4 may be rewritten as:

$$i_{BR,avg} = C_R \cdot \frac{2 \cdot V_{CRoff}}{\frac{T_{sw}}{2}} \quad [\text{EQ. 5}]$$

The approach indicated as C involves a current transformer 510. Like the approach indicated as B, this approach relies on the fact that $i_{BR}=i_{LR}$ when switches 240 SP1 and SP3 are on. The difference with the approach indicated as B is that $i_{LR}$ is sensed using the current transformer 510 in order to determine the average value $i_{BR,avg}$ of the input current $i_{BR}$ to the bidirectional converter 130. The voltage at the output of the current transformer 510 is low-pass filtered using RC filter 520, which includes filter resistance $R_f$ and filter capacitance $C_f$. The output voltage $V_{iLrf}$ of the RC filter 520 is sensed at the end of a half switching period (i.e., at turn off of the switch 240 $S_{P1}$) to obtain average value $i_{BR,avg}$ of the input current $i_{BR}$ as:

$$i_{BR,avg} = \frac{4 \cdot V_{iLrf,off} \cdot f_{sw}}{\omega_f \cdot K_{CT}} \quad [\text{EQ. 6}]$$

In EQ. 6, $V_{iLrf,off}$ is the value of the output voltage $V_{iLrf}$ at turn off of the switch 240 $S_{P1}$. In addition:

$$\omega_f = \frac{1}{R_f \cdot C_f} \quad [\text{EQ. 7}]$$

$$K_{CT} = \frac{R_{CT}}{N_{CT}} \quad [\text{EQ. 8}]$$

In EQ. 8, $R_{CT}$ is the load resistor at the output of the current transformer 510, and $N_{CT}$ is a number of secondary-side turns of the current transformer 510.

Figure 6:
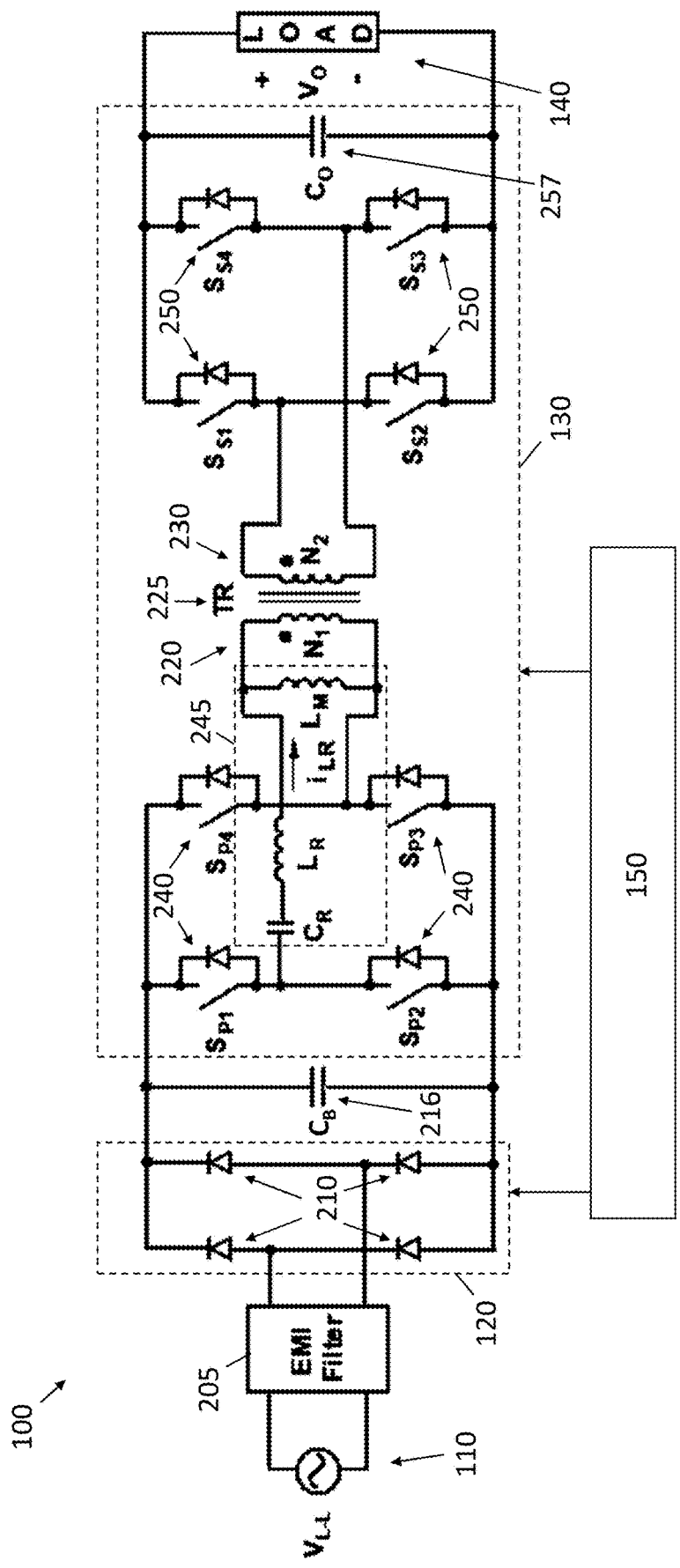
FIG. 6 is a circuit diagram of a single-stage bidirectional power supply according to another exemplary embodiment.

FIG. 6 is a circuit diagram of a single-stage bidirectional power supply 100 according to an exemplary embodiment. All of the components discussed with reference to FIG. 2 are not detailed again. The line-frequency rectifier/inverter 120 is shown with the switches 215 disabled during the exemplary AC to DC operation of the single-stage bidirectional power supply 100 shown FIG. 6. As compared with the exemplary configuration in FIG. 2, the exemplary configuration shown in FIG. 6 includes a full-bridge arrangement of the secondary-side switches 250 of the bidirectional converter 130.

In an AC to DC operation, the input voltage of the bidirectional converter 130 operates from 0 to a peak of the input voltage $V_{L-L}$. The control scheme discussed with reference to FIGS. 3A and 3B may be applied to the exemplary single-stage bidirectional power supply 100 of FIG. 6, as indicated. Specifically, based on the output DC voltage $V_{DC}$ at the DC port 140, in the case of AC to DC operation, or based on the output of the reference generator 370, in the case of DC to AC operation, a predefined switching frequency may be used with a controlled time delay between operation of the switches 240, 250 or a predefined time delay may be used with a controlled switching frequency.

Figure 7:
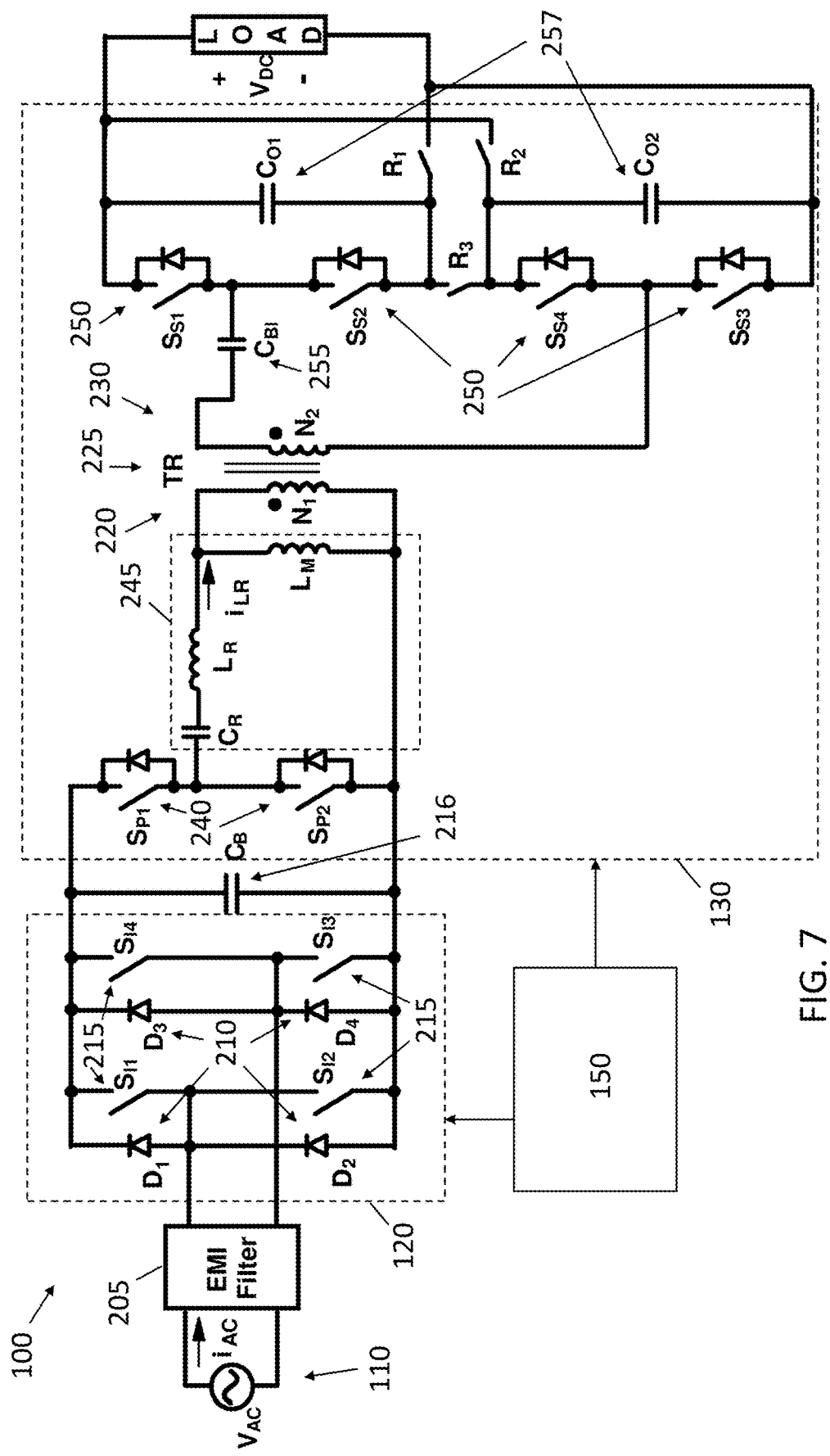
FIG. 7 is a circuit diagram of a single-stage bidirectional power supply according to yet another exemplary embodiment.

FIG. 7 is a circuit diagram of a single-stage bidirectional power supply 100 according to an exemplary embodiment. The previously discussed components that are also shown in FIGS. 2 and 6 are not detailed again. As discussed with reference to FIG. 2, the secondary port 230 may be dynamically modified via the relays $R_1$, $R_2$, and $R_3$ to operate with either a full-bridge or stacked half-bridge configuration. The exemplary configuration shown in FIG. 7 includes a half-bridge arrangement of the primary-side switches 240 of the bidirectional converter 130. As such, there are only two primary-side switches 240 $S_{P1}$ and $S_{P2}$. In this case, the output of the DPWM 340, during AC to DC operation, and the output of DPWM 350, during DC to AC operation, control the two primary-side switches $S_{P1}$ and $S_{P2}$.

In every other way, the control scheme discussed with reference to FIGS. 3A and 3B may be applied to the exemplary single-stage bidirectional power supply 100 of FIG. 7. Specifically, based on the output DC voltage $V_{DC}$ at the DC port 140, in the case of AC to DC operation, or based on the output of the reference generator 370, in the case of DC to AC operation, a predefined minimum switching frequency may be used with a controlled time delay between operation of the switches 240, 250 or a predefined minimum time delay may be used with a controlled switching frequency.

Figure 8:
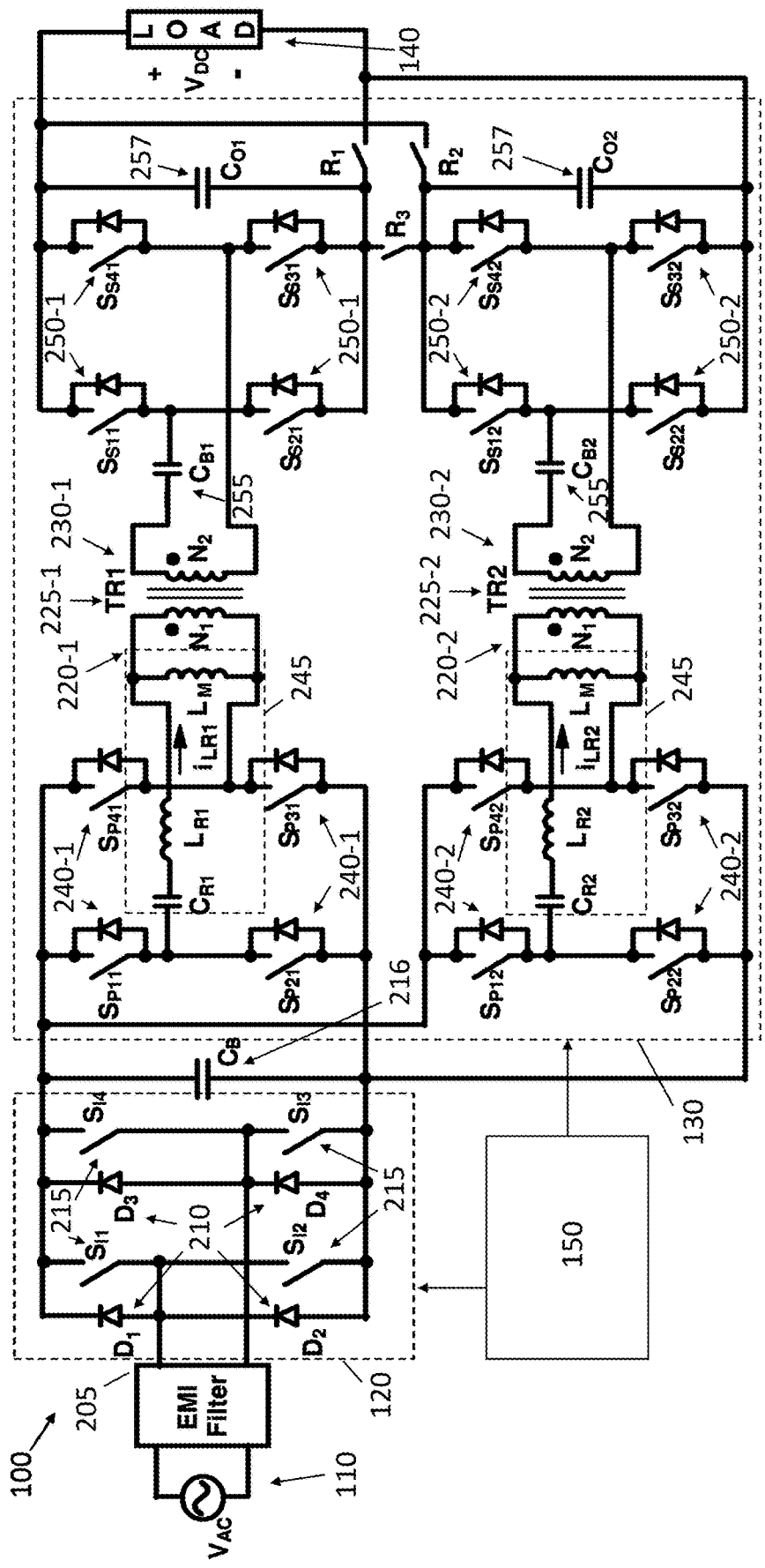
FIG. 8 is a circuit diagram of a single-stage bidirectional power supply according to yet another exemplary embodiment.

FIG. 8 is a circuit diagram of a single-stage bidirectional power supply 100 according to an exemplary embodiment. In the exemplary configuration, the single-stage bidirectional converter 130 is split into two parts, each with a transformer 225-1, 225-2 separating a primary port 220-1, 220-2 and a secondary port 230-1, 230-2. Each part resembles the configuration in FIG. 2 with a full-bridge configuration on the secondary side of the transformer. The two sets of primary-side switches 240-1 and 240-2 are connected in parallel at the input. The two sets of secondary-side switches 250-1 and 250-2 may be connected in parallel or in series based on control of the relays $R_1$, $R_2$, and $R_3$ by the controller 150. In either arrangement, the secondary-side switches 250-1 and 250-2 both have full-bridge configurations.

When the output DC voltage $V_{DC}$ at the DC port 140 is smaller than a threshold voltage, then relays $R_1$ and $R_2$ are turned on (closed) while relay $R_3$ is turned off (opened), thereby connecting the secondary-side switches 250-1 and 250-2 in parallel. When the output DC voltage $V_{DC}$ at the DC port 140 is larger than the threshold voltage, then relays $R_1$ and $R_2$ are turned off (opened) while relay $R_3$ is turned on (closed), thereby connecting the secondary-side switches 250-1 and 250-2 in series. For this exemplary configuration, the output of DPWM 340, during AC to DC operation, and the output of DPWM 350, during DC to AC operation, control both sets of primary-side switches 240-1 and 240-2, and the output of DPWM 350, during AC to DC operation, and the output of DPWM 340, during DC to AC operation, control both sets of secondary-side switches 250-1 and 250-2 according to the control scheme discussed with reference to FIGS. 3A and 3B.

Figure 9:
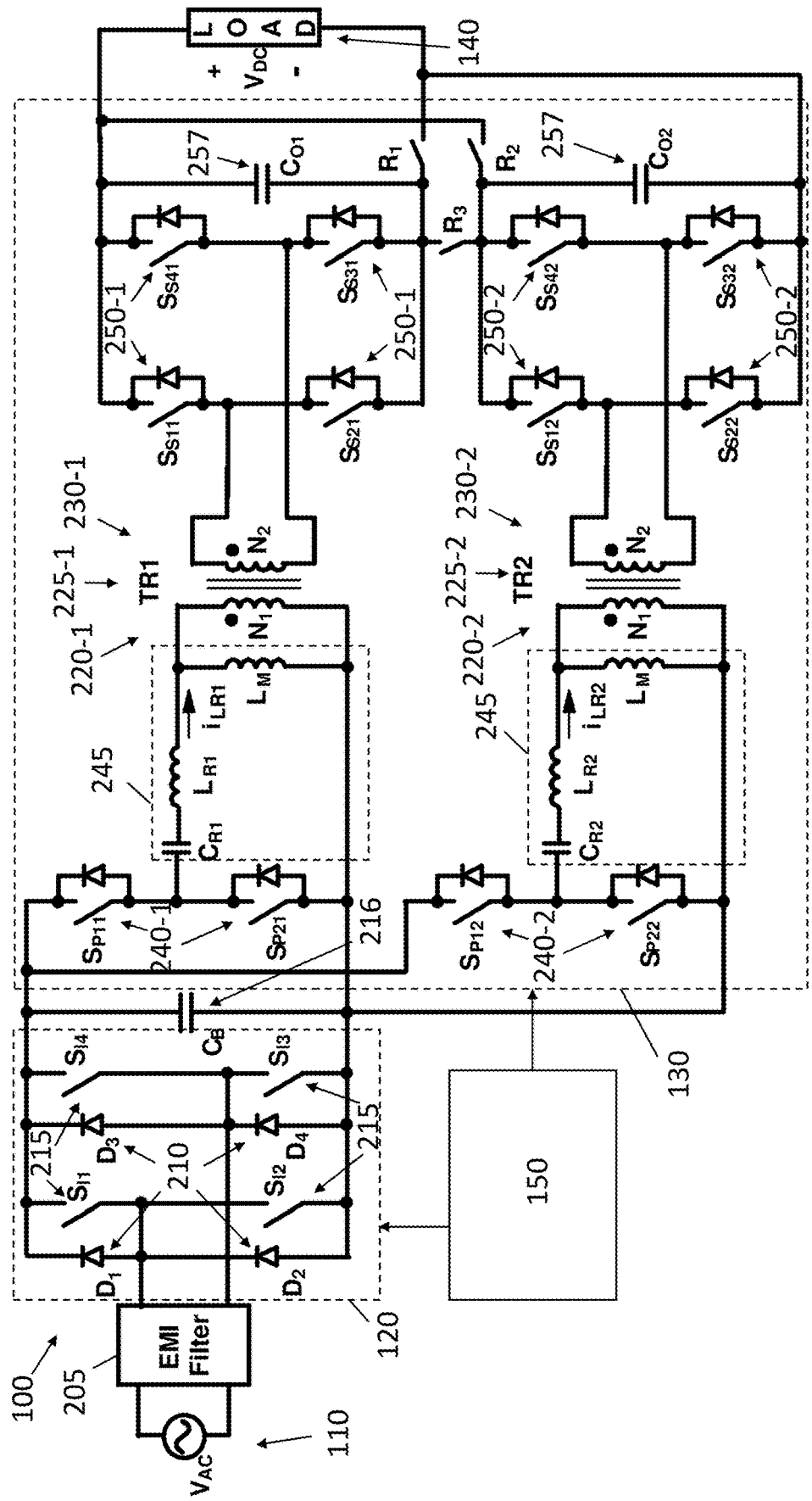
FIG. 9 is a circuit diagram of a single-stage bidirectional power supply according to yet another exemplary embodiment.

FIG. 9 is a circuit diagram of a single-stage bidirectional power supply 100 according to an exemplary embodiment. In the exemplary configuration, the single-stage bidirectional converter 130 is split into two parts, each with a transformer 225-1, 225-2 separating a primary port 220-1, 220-2 and a secondary port 230-1, 230-2. Similar to the configuration shown in FIG. 7, both the primary-side switches 240-1 and 240-2 have a half-bridge arrangement. As such, there are only two primary-side switches 240-1 $S_{P11}$ and $S_{P21}$ in the first part and only two primary-side switches 240-2 $S_{P12}$ and $S_{P22}$ in the second part. In this case, the output of the DPWM 340, during AC to DC operation, and the output of DPWM 350, during DC to AC operation, control the two primary-side switches 240-1 $S_{P11}$ and $S_{P21}$ and the two primary-side switches 240-2 $S_{P12}$ and $S_{P22}$.

At the two secondary ports 230-1 and 230-2, each of the respective secondary-side switches 250-1 and 250-2 is in a full-bridge configuration. The two sets of primary-side switches 240-1 and 240-2 are connected in parallel at the input. The two sets of secondary-side switches 250-1 and 250-2 may be connected in parallel or in series based on control of the relays $R_1$, $R_2$, and $R_3$ by the controller 150, similarly to the arrangement discussed with reference to FIG. 8. As is true of all the various configurations discussed for the single-stage bidirectional power supply 100, the control scheme discussed with reference to FIGS. 3A and 3B is used for the configuration shown in FIG. 9.

Figure 10:
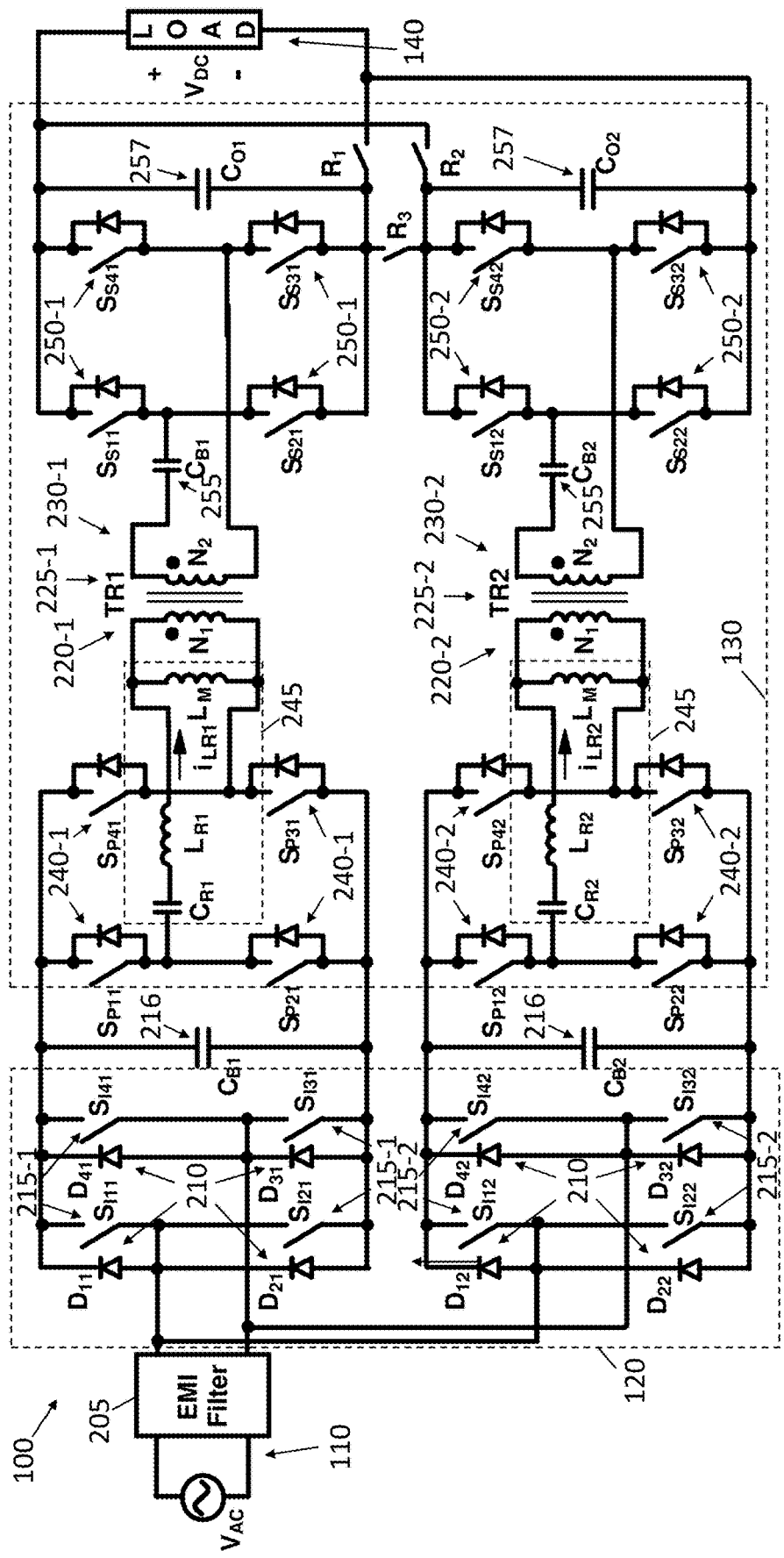
FIG. 10 is a circuit diagram of a single-stage bidirectional power supply according to yet another exemplary embodiment.

FIG. 10 is a circuit diagram of a single-stage bidirectional power supply 100 according to an exemplary embodiment. The controller 150 is part of the configuration of FIG. 10 but is not shown. In the exemplary configuration, the split to two parts is directly following the EMI filter 205. Thus, both the line-frequency rectifier/inverter 120 and the bidirectional converter 130 are split into two parts. Each part of the bidirectional converter 130 includes a transformer 225-1, 225-2 separating a primary port 220-1, 220-2 and a secondary port 230-1, 230-2. The line-frequency rectifier/inverter 120 and primary-side and secondary-side switches 240-1, 240-2, 250-1, and 250-2 are all in a full-bridge configuration. Each part of the line-frequency rectifier/inverter 120 and associated primary port 220-1, 220-2 is in parallel with the other. The two sets of secondary-side switches 250-1 and 250-2 may be connected in parallel or in series based on control of the relays $R_1$, $R_2$, and $R_3$ by the controller 150, similarly to the arrangement discussed with reference to FIG. 8. As is true of all the various configurations discussed for the single-stage bidirectional power supply 100, the control scheme discussed with reference to FIGS. 3A and 3B is used for the configuration shown in FIG. 10 with the DPWM 340 and DPWM 350 each controlling eight switches (i.e., both 240-1 and 240-2 or both 250-1 and 250-1) rather than four, as indicated in FIGS. 3A and 3B.

Figure 11:
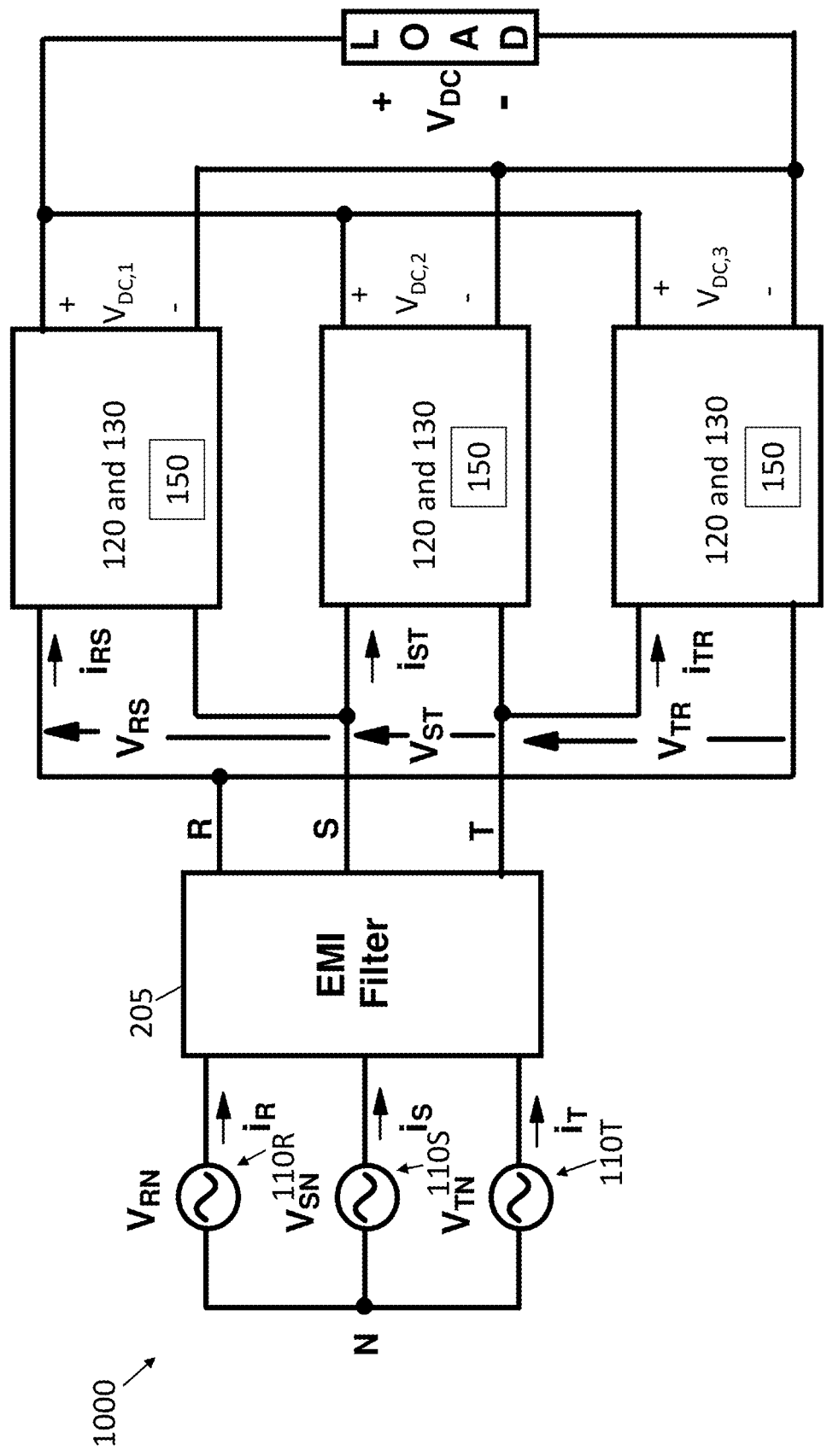
FIG. 11 is a block diagram of an exemplary three-phase power supply that implements the rectifier/inverter and the bidirectional converter according to embodiments of the single-stage bidirectional power supply for each phase.

FIGS. 11-14 illustrate different embodiments of a three-phase power supply 1000 that includes various embodiments of the line-frequency rectifier/inverter 120 and the bidirectional converter 130, along with the control scheme discussed with reference to FIGS. 3A and 3B. FIG. 11 is a block diagram of a three-phase power supply 1000 that implements the rectifier/inverter 120 and the bidirectional converter 130 for each phase according to one or more embodiments. As shown, the rectifier/inverter 120 and the bidirectional converter 130 of each phase is controlled by a separate controller 150 that implements the control discussed with reference to FIGS. 3A and 3B. The exemplary arrangement is not intended to limit the various ways that the control scheme discussed with reference to FIGS. 3A and 3B may be implemented. The control functionality may be combined into one controller 150 or split into two or more than three controllers 150 according to alternate embodiments.

In the exemplary embodiment of FIG. 11, the three phases share a common EMI filter 205. Further, each line-frequency rectifier/inverter 120 and bidirectional converter 130 pair is connected to the phase-to-phase input terminals. Each line-frequency rectifier/inverter 120 and bidirectional converter 130 pair may be implemented according to any of the embodiments detailed with reference to FIGS. 2 and 6-10. The voltages $V_{TN}$, $V_{SN}$, $V_{RN}$ associated with the different phases are phase-shifted by 120 degrees from each other.

Thus, the ripple of the output DC voltages of the three phases ($V_{DC,1}$, $V_{DC,2}$, $V_{DC,3}$) are also 120 degrees phase-shifted from each other. As the outputs of the three rectifier/inverter 120 and bidirectional converter 130 pairs are connected in parallel, the ripple of the DC output voltage $V_{DC}$ is very small.

Figure 12:
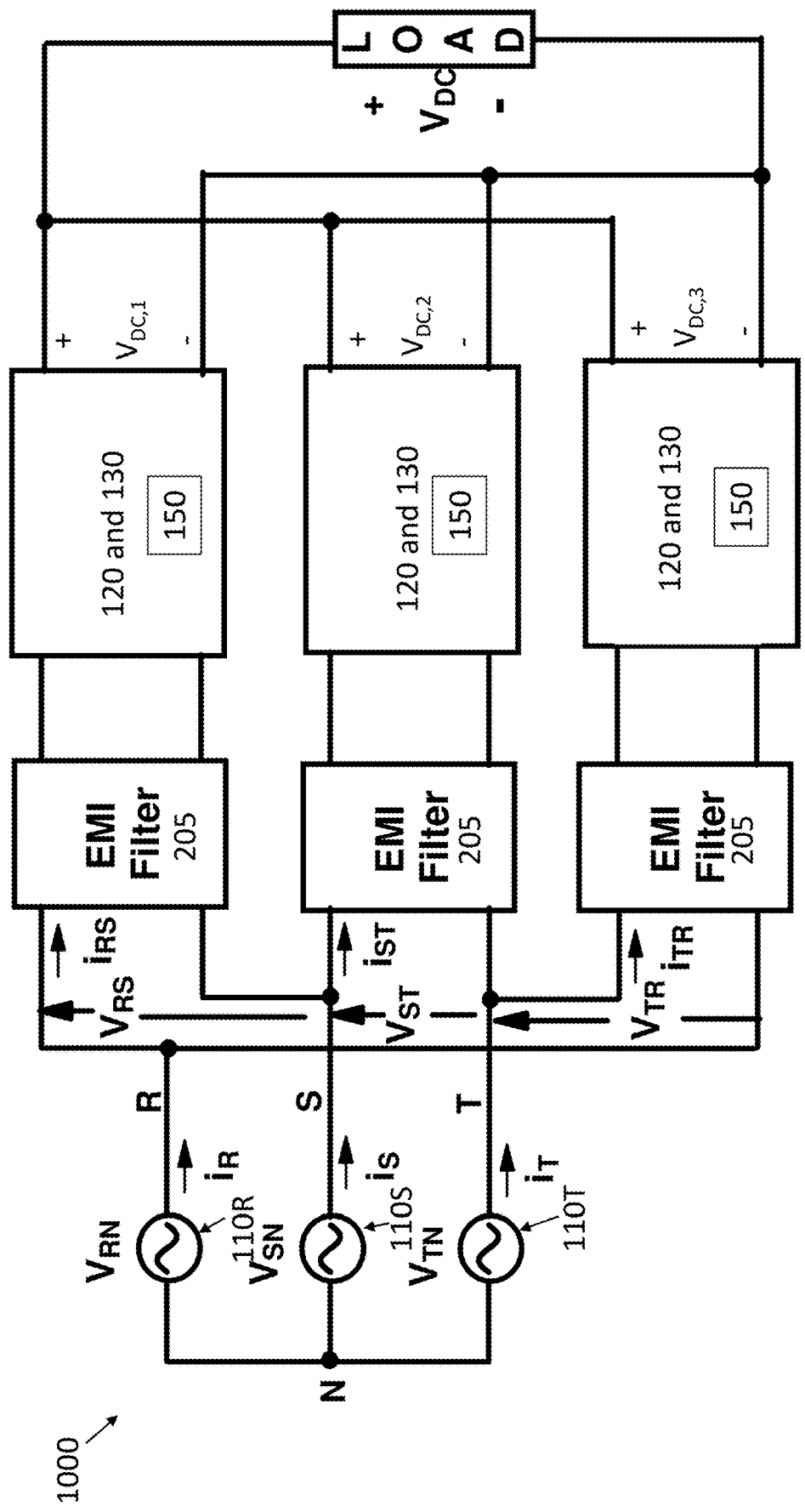
FIG. 12 is a block diagram of another exemplary three-phase power supply that implements the rectifier/inverter and the bidirectional converter according to embodiments of the single-stage bidirectional power supply for each phase.

FIG. 12 is a block diagram of a three-phase power supply 1000 that implements the line-frequency rectifier/inverter 120 and the bidirectional converter 130 for each phase according to one or more embodiments. The configuration shown in FIG. 12 differs from the configuration of FIG. 11 in that a separate EMI filter 205 is provided for each phase. This embodiment is further detailed in FIG. 13.

Figure 13:
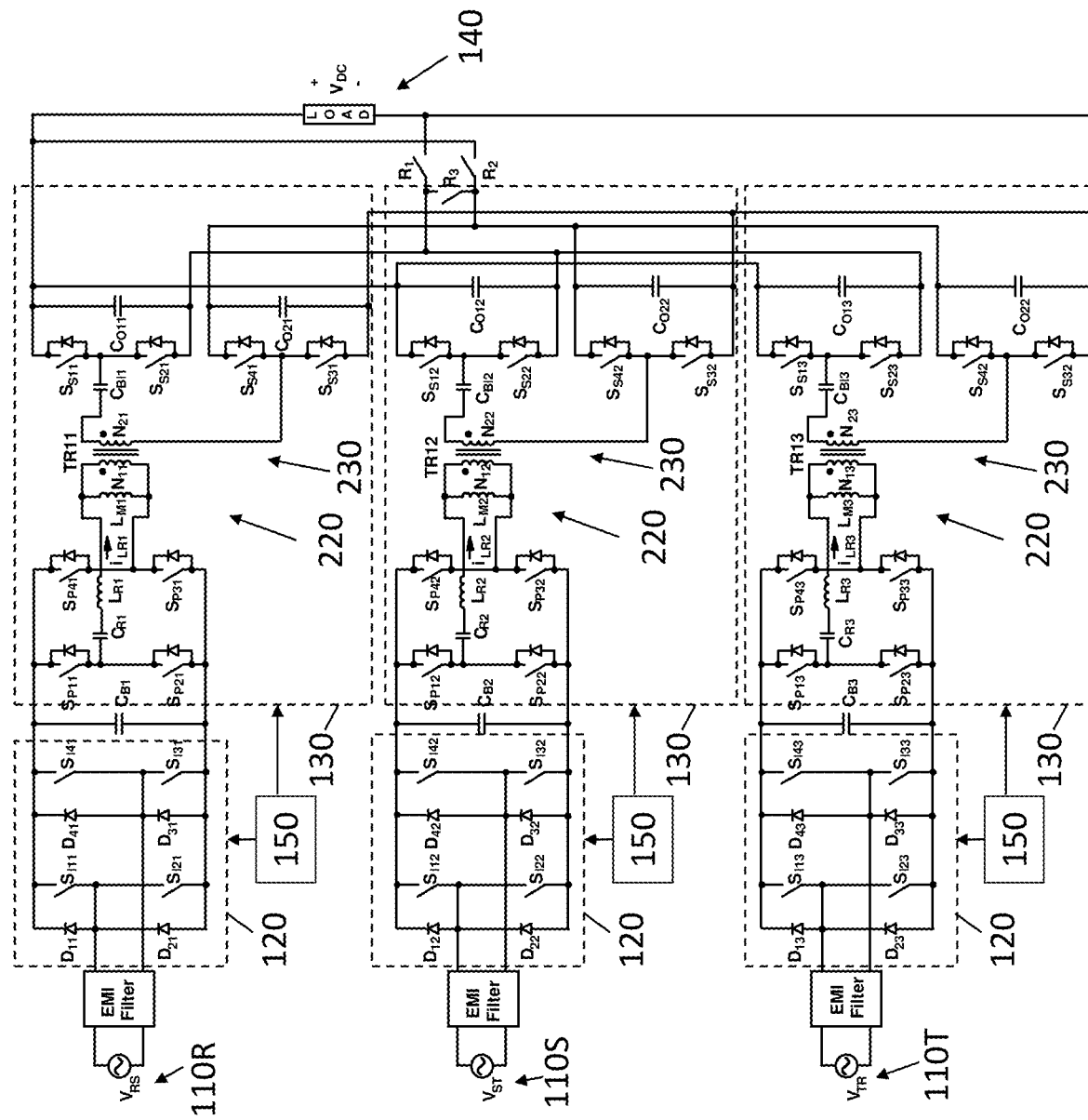
FIG. 13 is a circuit diagram of the three-phase power supply of FIG. 11.

FIG. 13 is a circuit diagram of the three-phase power supply 1000 shown in FIG. 12. As shown, the exemplary embodiment of each line-frequency rectifier/inverter 120 and bidirectional converter 130 pair is similar to the embodiment shown in FIG. 2. The relays $R_1$, $R_2$, and $R_3$ may be controlled by one or more of the controllers 150 or by a separate controller to connect the secondary port 230 of the three bidirectional converters 130 in a full-bridge or stacked half-bridge arrangement. The control of the relays $R_1$, $R_2$, and $R_3$ may be based on the value of the output DC voltage $V_{DC}$, as discussed with reference to FIG. 8.

Figure 14:
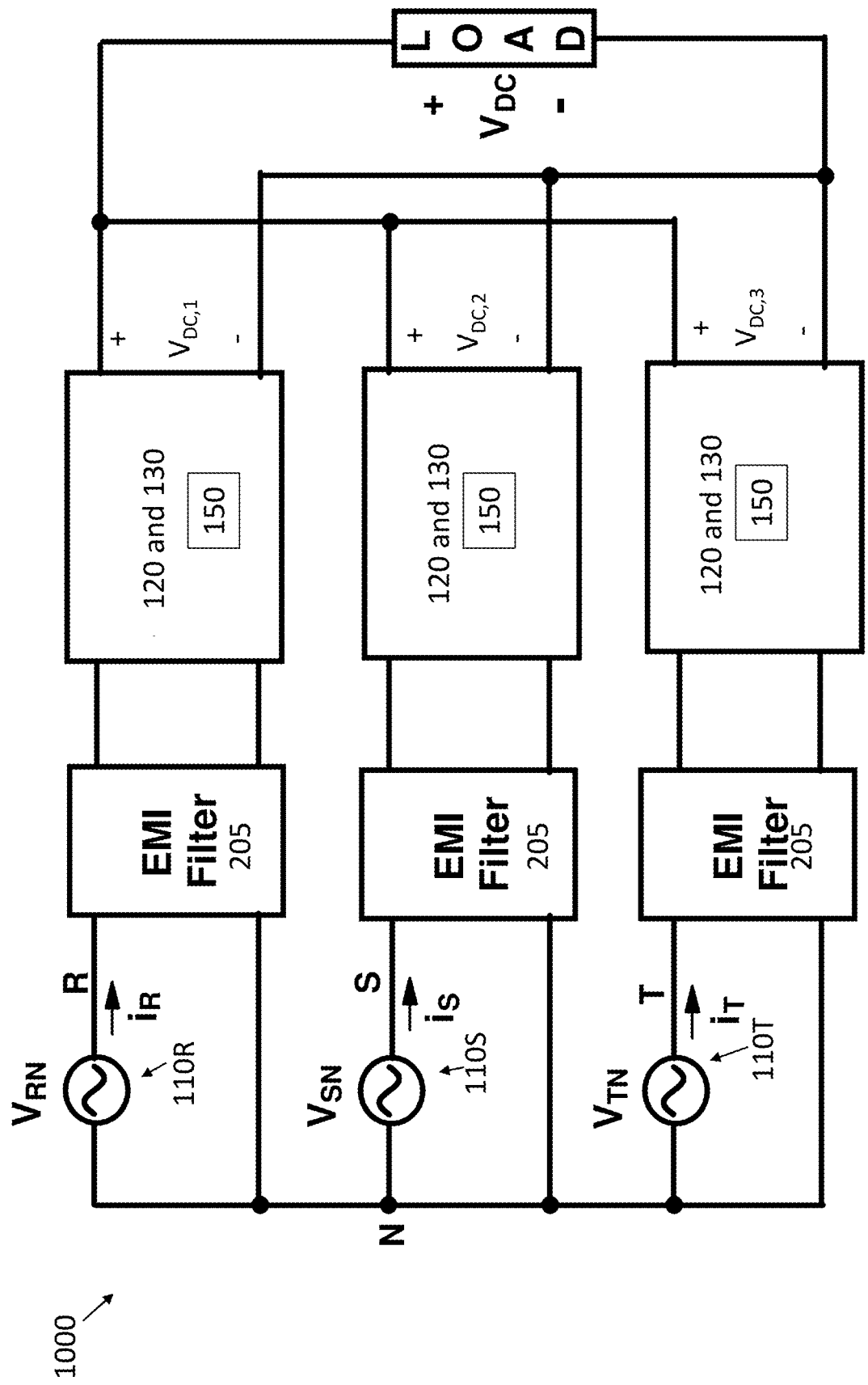
FIG. 14 is a block diagram of yet another exemplary three-phase power supply that implements the rectifier/inverter and the bidirectional converter according to embodiments of the single-stage bidirectional power supply for each phase.

FIG. 14 is a block diagram of a three-phase power supply 1000 that implements the line-frequency rectifier/inverter 120 and the bidirectional converter 130 for each phase according to one or more embodiments. The embodiment shown in FIG. 14 differs from the embodiment shown in FIG. 12 in that each line-frequency rectifier/inverter 120 and bidirectional converter 130 pair is connected to the phase-neutral input terminals (rather than to the phase-to-phase input terminals). Another exemplary variation of FIG. 14 involves the three phases sharing a common EMI filter 205, as shown in FIG. 11.

According to the various aspects and embodiments detailed herein:

A bidirectional power supply includes an alternating current (AC) port as a source in a first mode of operation and as a load in a second mode of operation and a line-frequency rectifier/inverter including a set of diodes to function as a rectifier to rectify an AC input from the AC port in the first mode of operation and a set of switches to function as an inverter to supply the AC port in the second mode of operation. A bidirectional resonant converter is coupled to a direct current (DC) port. The bidirectional resonant converter includes a primary port with primary-side switches and a secondary side port with secondary-side switches respectively arranged on a primary and secondary side of a transformer. A controller controls the primary-side switches and the secondary-side switches during a first control mode by controlling a switching frequency based on a determined value while setting a time delay between control of the primary-side switches and the secondary-side switches to be a predefined time delay. The controller controls the primary-side switches and the secondary-side switches during a second control mode by controlling the time delay between control of the primary-side switches and the secondary-side switches based on a determined value while setting the switching frequency to be a predefined switching frequency.

The controller controls the set of switches at a fixed frequency based on a frequency of AC current at the AC port.

An electromagnetic interference (EMI) filter is disposed between the AC port and the line-frequency rectifier/inverter.

A capacitor is arranged between the line-frequency rectifier/inverter and the bidirectional resonant converter. A voltage $V_B$ across the capacitor is a rectified AC voltage.

During AC to DC operation of the bidirectional power supply, the controller applies the time delay from control of the primary-side switches to control of the secondary-side switches.

The controller obtains an output voltage $V_{DC}$ at the DC port, the voltage $V_B$ across the capacitor, and an average input current of the bidirectional resonant converter $i_{BR,avg}$ to determine a control voltage $V_{iea}$.

The controller obtains the control voltage $V_{iea}$ directly from a current controller or from an adder arranged to add an output of the current controller and a mapped voltage obtained from a mapping of the output voltage $V_{DC}$ at the DC port, the voltage $V_B$ across the capacitor, a voltage $V_{AC}$ at the AC port, or a power output at the DC port to the mapped voltage.

The controller provides the control voltage $V_{iea}$ to a first limiter that provides the time delay and a second limiter that provides the switching frequency and either the first limiter causes the time delay to be the predefined time delay or the second limiter causes the switching frequency to be the predefined switching frequency but not both.

During DC to AC operation of the bidirectional power supply, the controller applies the time delay from control of the secondary-side switches to control of the primary-side switches.

The controller obtains a reference AC current $i_{AC,ref}$ or a reference AC voltage $V_{AC,ref}$ from a reference generator and the voltage $V_B$ across the capacitor to determine a control voltage $V_{iea}$.

The controller provides the control voltage $V_{iea}$ to a first limiter that provides the time delay and a second limiter that provides the switching frequency and either the first limiter causes the time delay to be the predefined time delay or the second limiter causes the switching frequency to be the predefined switching frequency but not both.

The primary-side switches of the bidirectional resonant converter are arranged in a full-bridge or half-bridge configuration and the secondary-side switches of the bidirectional resonant converter are arranged in a full-bridge or a stacked half-bridge configuration.

The secondary-side switches are arranged in the stacked half-bridge configuration and the secondary port includes relays to be controlled to maintain the stacked half-bridge configuration when an output voltage $V_{DC}$ at the DC port is above a threshold value and to convert to the full-bridge configuration when the output voltage $V_{DC}$ at the DC port is below a threshold value.

The bidirectional resonant converter includes a second primary port with second primary-side switches and a second secondary side port with second secondary-side switches respectively arranged on a primary and secondary side of a second transformer.

A second line-frequency rectifier/inverter is coupled to the second primary port.

The power supply is a three-phase power supply such that the AC port includes three ports of different phases and each of the three ports is coupled to a pair of the line-frequency rectifier/inverter and the bidirectional resonant converter.

A bidirectional resonant converter includes a primary port with primary-side switches and a secondary side port with secondary-side switches respectively arranged on a primary and secondary side of a transformer. A controller controls the primary-side switches and the secondary-side switches during a first control mode by controlling a switching frequency based on a determined value while setting a time delay between control of the primary-side switches and the secondary-side switches to be a predefined time delay. The controller controls the primary-side switches and the secondary-side switches during a second control mode by controlling the time delay between control of the primary-side switches and the secondary-side switches based on a determined value while setting the switching frequency to be a predefined switching frequency.

The primary-side switches of the bidirectional resonant converter are arranged in a full-bridge or half-bridge configuration and the secondary-side switches of the bidirectional resonant converter are arranged in a full-bridge or a stacked half-bridge configuration and the secondary-side switches are arranged in the stacked half-bridge configuration. The secondary port includes relays to be controlled to maintain the stacked half-bridge configuration when an output voltage $V_{DC}$ at the secondary port is above a threshold value and to convert to the full-bridge configuration when the output voltage $V_{DC}$ is below a threshold value.

The bidirectional resonant converter includes a second primary port with second primary-side switches and a second secondary side port with second secondary-side switches respectively arranged on a primary and secondary side of a second transformer.

A method of manufacturing a bidirectional resonant converter includes coupling a line-frequency rectifier/inverter to an AC port. The line-frequency rectifier/inverter includes a set of diodes to function as a rectifier to rectify an AC input from the AC port in a first mode of operation and a set of switches to function as an inverter to supply the AC port in a second mode of operation. The method also includes coupling a bidirectional resonant converter to the line-frequency rectifier/inverter and to a direct current (DC) port. The bidirectional resonant converter includes a primary port with primary-side switches and a secondary side port with secondary-side switches respectively arranged on a primary and secondary side of a transformer. A controller is configured to control the primary-side switches and the secondary-side switches during a first control mode by controlling a switching frequency based on a determined value while setting a time delay between control of the primary-side switches and the secondary-side switches to be a predefined time delay. The controller is also configured to control the primary-side switches and the secondary-side switches during a second control mode by controlling the time delay between control of the primary-side switches and the secondary-side switches based on a determined value while setting the switching frequency to be a predefined switching frequency.

Although explanatory embodiments have been described, other embodiments are possible. Therefore, the spirit and scope of the claims should not be limited to the description of the exemplary embodiments.

What is claimed is:

1. A bidirectional power supply, the power supply comprising:
    an alternating current (AC) port configured as a source in a first mode of operation and as a load in a second mode of operation;
    a line-frequency rectifier/inverter including a set of diodes configured to function as a rectifier to rectify an AC input from the AC port in the first mode of operation and a set of switches to function as an inverter to supply the AC port in the second mode of operation;
    a bidirectional resonant converter coupled to the line-frequency rectifier/inverter and to a direct current (DC)

port, the bidirectional resonant converter including a primary port with primary-side switches and a secondary side port with secondary-side switches respectively arranged on a primary and secondary side of a transformer; and a controller configured to control the primary-side switches and the secondary-side switches during a first control mode by controlling a switching frequency based on a determined value while setting a time delay between control of the primary-side switches and the secondary-side switches to be predefined, and to control the primary-side switches and the secondary-side switches during a second control mode by controlling the time delay between control of the primary-side switches and the secondary-side switches based on a determined value while setting the switching frequency to be predefined.

2. The power supply according to claim 1, wherein the controller is further configured to control the set of switches at a fixed frequency based on a frequency of AC current at the AC port.

3. The power supply according to claim 1, further comprising an electromagnetic interference (EMI) filter disposed between the AC port and the line-frequency rectifier/inverter.

4. The power supply according to claim 1, further comprising a capacitor arranged between the line-frequency rectifier/inverter and the bidirectional resonant converter, wherein a voltage ($V_B$) across the capacitor is a rectified AC voltage.

5. The power supply according to claim 4, wherein, during AC to DC operation of the bidirectional power supply, the controller applies the time delay from control of the primary-side switches to control of the secondary-side switches.

6. The power supply according to claim 5, wherein the controller is further configured to obtain an output voltage ($V_{DC}$) at the DC port, the voltage ($V_B$) across the capacitor, and an average input current of the bidirectional resonant converter ($i_{BR,avg}$) to determine a control voltage ($V_{iea}$).

7. The power supply according to claim 6, wherein the controller is configured to obtain the control voltage ($V_{iea}$) directly from a current controller or from an adder arranged to add an output of the current controller and a mapped voltage obtained from a mapping of the output voltage ($V_{DC}$) at the DC port, the voltage ($V_B$) across the capacitor, a voltage (VAC) at the AC port, or a power output at the DC port to the mapped voltage.

8. The power supply according to claim 6, wherein the controller is configured to provide the control voltage ($V_{iea}$) to a first limiter that provides the time delay and a second limiter that provides the switching frequency and either the first limiter causes the time delay to be predefined or the second limiter causes the switching frequency to be predefined but not both.

9. The power supply according to claim 4, wherein, during DC to AC operation of the bidirectional power supply, the controller applies the time delay from control of the secondary-side switches to control of the primary-side switches.

10. The power supply according to claim 9, wherein the controller is further configured to obtain a reference AC current ($i_{AC,ref}$) or a reference AC voltage ($V_{AC,ref}$) from a reference generator and the voltage $V_B$ across the capacitor to determine a control voltage ($V_{iea}$).

11. The power supply according to claim 10, wherein the controller is configured to provide the control voltage ($V_{iea}$) to a first limiter that provides the time delay and a second limiter that provides the switching frequency and either the first limiter causes the time delay to be predefined time delay or the second limiter causes the switching frequency to be predefined but not both.

12. The power supply according to claim 1, wherein the primary-side switches of the bidirectional resonant converter are arranged in a full-bridge or half-bridge configuration and the secondary-side switches of the bidirectional resonant converter are arranged in a full-bridge or a stacked half-bridge configuration.

13. The power supply according to claim 12, wherein the secondary-side switches are arranged in the stacked half-bridge configuration and the secondary port further comprises relays configured to be controlled to maintain the stacked half-bridge configuration when an output voltage ($V_{DC}$) at the DC port is above a threshold value and to convert to the full-bridge configuration when the output voltage ($V_{DC}$) at the DC port is below a threshold value.

14. The power supply according to claim 1, wherein the bidirectional resonant converter includes a second primary port with second primary-side switches and a second secondary side port with second secondary-side switches respectively arranged on a primary and secondary side of a second transformer.

15. The power supply according to claim 14, wherein a second line-frequency rectifier/inverter is coupled to the second primary port.

16. The power supply according to claim 1, wherein the power supply is a three-phase power supply such that the AC port includes three ports of different phases and each of the three ports is coupled to a pair of the line-frequency rectifier/inverter and the bidirectional resonant converter.

17. A bidirectional resonant converter, comprising:

a primary port with primary-side switches and a secondary side port with secondary-side switches respectively arranged on a primary and secondary side of a transformer; and a controller configured to control the primary-side switches and the secondary-side switches during a first control mode by controlling a switching frequency based on a determined value while setting a time delay between control of the primary-side switches and the secondary-side switches to be predefined, and to control the primary-side switches and the secondary-side switches during a second control mode by controlling the time delay between control of the primary-side switches and the secondary-side switches based on a determined value while setting the switching frequency to be predefined.

18. The bidirectional resonant converter according to claim 17, wherein the primary-side switches of the bidirectional resonant converter are arranged in a full-bridge or half-bridge configuration and the secondary-side switches of the bidirectional resonant converter are arranged in a full-bridge or a stacked half-bridge configuration and the secondary-side switches are arranged in the stacked half-bridge configuration, and the secondary port further comprises relays configured to be controlled to maintain the stacked half-bridge configuration when an output voltage ($V_{DC}$) at the secondary port is above a threshold value and to convert to the full-bridge configuration when the output voltage ($V_{DC}$) is below a threshold value.

19. The bidirectional resonant converter according to claim 17, wherein the bidirectional resonant converter includes a second primary port with second primary-side switches and a second secondary side port with second secondary-side switches respectively arranged on a primary and secondary side of a second transformer.

20. A method of manufacturing a bidirectional resonant converter, the method comprising:
- coupling a line-frequency rectifier/inverter to an AC port, wherein the line-frequency rectifier/inverter includes a set of diodes configured to function as a rectifier to rectify an AC input from the AC port in a first mode of operation and a set of switches to function as an inverter to supply the AC port in a second mode of operation;
- coupling a bidirectional resonant converter to the line-frequency rectifier/inverter and to a direct current DC port, wherein the bidirectional resonant converter includes a primary port with primary-side switches and a secondary side port with secondary-side switches respectively arranged on a primary and secondary side of a transformer; and
- configuring a controller to control the primary-side switches and the secondary-side switches during a first control mode by controlling a switching frequency based on a determined value while setting a time delay between control of the primary-side switches and the secondary-side switches to be predefined, and to control the primary-side switches and the secondary-side switches during a second control mode by controlling the time delay between control of the primary-side switches and the secondary-side switches based on a determined value while setting the switching frequency to be predefined.

* * * * *